United States Patent
Thangarasa et al.

(10) Patent No.: US 11,622,285 B2
(45) Date of Patent: Apr. 4, 2023

(54) PERFORMING MEASUREMENTS IN MULTICARRIER OPERATION

(71) Applicant: Telefonaktiebolaget LM Ericsson (publ), Stockholm (SE)

(72) Inventors: Santhan Thangarasa, Vällingby (SE); Johan Bergman, Stockholm (SE); Muhammad Kazmi, Sundbyberg (SE); Gerardo Agni Medina Acosta, Märsta (SE); Ritesh Shreevastav, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 271 days.

(21) Appl. No.: 16/719,296

(22) Filed: Dec. 18, 2019

(65) Prior Publication Data

US 2020/0275289 A1 Aug. 27, 2020

Related U.S. Application Data

(60) Provisional application No. 62/810,643, filed on Feb. 26, 2019.

(51) Int. Cl.
*H04W 24/02* (2009.01)
*H04B 17/309* (2015.01)
*H04W 64/00* (2009.01)

(52) U.S. Cl.
CPC .......... *H04W 24/02* (2013.01); *H04B 17/309* (2015.01); *H04W 64/00* (2013.01)

(58) Field of Classification Search
CPC ..... H04B 17/309; H04W 24/02; H04W 64/00
See application file for complete search history.

(56) References Cited

U.S. PATENT DOCUMENTS

| | | | |
|---|---|---|---|
| 2017/0070904 A1* | 3/2017 | Mali | H04W 24/08 |
| 2017/0238292 A1* | 8/2017 | Rico Alvarino | B65D 19/06 |
| | | | 370/329 |
| 2019/0007872 A1* | 1/2019 | Sundberg | H04B 17/104 |

FOREIGN PATENT DOCUMENTS

| | | | | |
|---|---|---|---|---|
| WO | 2017133700 A1 | 8/2017 | | |
| WO | WO-2017133700 A1 * | 8/2017 | ........... | H04L 5/0091 |

OTHER PUBLICATIONS

Unknown, Author, "3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.2.0, Jun. 2016, pp. 1-623.

Unknown, Author, "3rd Generation Partnership Project; Technical Specification Group Radio Access Network; Evolved Universal Terrestrial Radio Access (E-UTRA); User Equipment (UE) procedures in idle mode (Release 15)", 3GPP TS 36.304 V15.2.0, Dec. 2018, pp. 1-55.

(Continued)

*Primary Examiner* — Natasha W Cosme
(74) *Attorney, Agent, or Firm* — Murphy, Bilak & Homiller, PLLC

(57) ABSTRACT

A wireless device selects, from among at least first and second measurement modes in which measurements are respectively performed on cells belonging to first and second carriers, one or more measurement modes in which to perform a measurement. The one or more measurement modes are selected based on whether criteria is met for relaxed monitoring of a neighbor cell, and on whether the wireless device is configured to perform a positioning measurement. The wireless device performs the measurement in the one or more selected measurement modes.

27 Claims, 18 Drawing Sheets

(56) References Cited

OTHER PUBLICATIONS

Unknown, Author, "3rd Generation Partnership Project; Technical Specification Group Radio Access Network; Evolved Universal Terrestrial Radio Access (E-UTRA); User Equipment (UE) radio access capabilities (Release 15)", 3GPP TS 36.306 V15.2.0, Sep. 2018, pp. 1-109.
Unknown, Author, "3rd Generation Partnership Project; Technical Specification Group Services and System Aspects; Architecture enhancements to facilitate communications with packet data networks and applications (Release 16)", 3GPP TS 23.682 V16.1.0, Dec. 2018, pp. 1-126.
Unknown, Author, "Non-anchor carrier measurements for RRM", 3GPP TSG RAN WG2 #104 Tdoc; R2-1816548; Spokane, USA, Nov. 12-16, 2018, pp. 1-4.
Unknown, Author, "NB-IoT Paging on non-anchor PRBs", 3GPP TSG-RAN WG1 #87; R1-1611124; Reno, Nevada, USA, Nov. 14-18, 2016, pp. 1-3.
Unknown, Author, "NR PDCCH UE Demodulation Requirements", 3GPP TSG-RAN WG4 Meeting #90; R4-1900118; Athens, GR, Feb. 25-Mar. 1, 2019, pp. 1-3.
Unknown, Author, "On R16 additional enhancements to NB-IoT", 3GPP TSG-RAN WG4 Meeting #90; R4-18xxxxx; Athens, Greece, Feb. 25.-Mar. 1, 2019, pp. 1-7.
Unknown, Author, "Presence of NRS on a non-anchor carrier for paging in NB-IoT", 3GPP TSG-RAN WG1 Meeting #94bis; Tdoc R1-1810199; Chengdu, China, Oct. 8-12, 2018, pp. 1-5.

* cited by examiner

SELECTING, FROM AMONG AT LEAST FIRST AND SECOND MEASUREMENT MODES IN WHICH MEASUREMENTS ARE RESPECTIVELY PERFORMED ON CELLS BELONGING TO FIRST AND SECOND CARRIERS, ONE OR MORE MEASUREMENT MODES IN WHICH A WIRELESS DEVICE IS TO PERFORM OR IS ALLOWED TO PERFORM A MEASUREMENT
300

TRANSMITTING, TO THE WIRELESS DEVICE, CONTROL SIGNALING INDICATING THE ONE OR MORE SELECTED MEASUREMENT MODES
310

*FIGURE 3*

PERFORMING MEASUREMENTS IN MULTICARRIER OPERATION

TECHNICAL FIELD

The present application relates generally to multicarrier operation in a wireless communication system, and relates more particularly to performing measurements in such multicarrier operation.

BACKGROUND

In Narrowband Internet-of-Things (NB-IoT) systems, an anchor carrier is a carrier on which System Information is broadcast, e.g., on a Narrowband Physical Broadcast Channel (NPBCH). A non-anchor carrier is a carrier on which no such System Information is broadcast. In multicarrier operation, an NB-IoT device may receive control information and/or user/application data on a non-anchor carrier, but may receive System Information on the anchor carrier. The device therefore must retune to the anchor carrier occasionally or periodically to receive System Information. In some NB-IoT implementations where synchronization signals are only transmitted on an anchor carrier, the device may also have to retune to the anchor carrier to receive such synchronization signals.

An NB-IoT device also performs measurements on certain signals or channels from time to time for various purposes. For example, an NB-IoT device may measure a reference signal (e.g., Narrowband Reference Signal, NRS) for radio resource management (RRM), If the signal or channel on which a measurement is to be performed is only transmitted on the anchor carrier, the device must retune to the anchor carrier to perform that measurement. Requiring a device to switch between carriers to perform a measurement may inefficiently consume device power and/or network resources. On the other hand, if the signal or channel on which a measurement is to be performed is alternatively or additionally transmitted on a non-anchor carrier, the device could perform the measurement without having to retune to the anchor carrier. But it may not always be appropriate or desirable for the device to perform the measurement on the non-anchor carrier. For example, if a device bases its measurement on a non-anchor carrier but enters into sleep-mode, by the time the device wakes up its connection to the non-anchor carrier may have been lost.

SUMMARY

Some embodiments herein specify certain conditions or criteria that govern ire which of different measurement modes a wireless device performs a measurement. In one or more embodiments where the measurement modes dictate or are otherwise associated with performance of the measurement on different carriers (e.g., anchor vs. non-anchor), the certain conditions or criteria may effectively govern on which carrier the wireless device performs a measurement. In some embodiments, for example, the wireless device is allowed to perform the measurement in a certain mode or on a certain carrier (e.g., non-anchor carrier) if at least two of the certain conditions or criteria are met. Otherwise, the device may not be allowed to perform the measurement in that certain mode or on that certain carrier. In these and other embodiments, the criteria or conditions may relate to two or more of: mobility or channel conditions of the device, a transmit power difference between the carriers, whether the device is already configured to perform another measurement on one of the carriers, a frequency difference between the carriers, and times at which a signal or channel to be measured is transmitted on the carriers.

According to some embodiments herein, then, a wireless device selects between different measurement modes or carriers for measurement performance based on certain conditions or criteria. These conditions or criteria may be configured such that unnecessary switching between modes or carriers is avoided. This may in turn conserve UE power and preserve scheduling opportunities that would have otherwise been lost.

More particularly, embodiments herein include a method performed by a wireless device. The method comprises selecting, from among at least first and second measurement modes in which measurements are respectively performed on cells belonging to first and second carriers, one or more measurement modes in which to perform a measurement. The one or more measurement modes may be selected based on: whether criteria is met for relaxed monitoring of a neighbor cell, and whether the wireless device is configured to perform a positioning measurement. Regardless, the method may further include performing the measurement in the one or more selected measurement modes.

In some embodiments, said selecting comprises selecting only the second measurement mode if the criteria is met and the wireless device is not configured to perform a positioning measurement.

In some embodiments, the wireless device is allowed to select only the second measurement mode if the criteria is met and the wireless device is not configured to perform a positioning measurement.

In some embodiments, the one or more measurement modes are selected also based on information related to a difference between powers at which a signal or channel to be measured is respectively transmitted on the first and second carriers.

In some embodiments, the measurement is a radio resource management, RRM, measurement or a mobility measurement.

In some embodiments, the measurement is a reference signal received power (RSRP) measurement, a reference signal received quality (RSRQ) measurement, a signal-to-interference-plus-noise (SINR) measurement, or a path loss measurement.

In some embodiments, the relaxed monitoring of the neighbor cell relaxes how often the wireless device is to perform measurements on the neighbor cell.

In some embodiments, the method further comprises performing one or more operational tasks based on the result of the performed measurement. In one such embodiment, the one or more operational tasks include one or more of: power control; reporting a result of the measurement to a network node; a random access procedure; cell selection; or cell reselection.

In some embodiments, the method further comprises reporting a measurement result to a network node based on the selected measurement mode and information related to a difference between powers at which a signal or channel to be measured is respectively transmitted on the first and second carriers.

In some embodiments, the first carrier is an anchor carrier on which System Information is broadcast and the second carrier is a non-anchor carrier on which System Information is not broadcast.

In some embodiments, the first and second carriers are each a Narrowband Internet-of-Things (NB-IoT) carrier.

Embodiments herein also include corresponding apparatus, computer programs, and carriers such as non-transitory computer-readable mediums. For example, embodiments herein include a wireless device. The wireless device comprises communication circuitry and processing circuitry. The processing circuitry is configured to select, from among at least first and second measurement modes in which measurements are respectively performed on cells belonging to first and second carriers, one or more measurement modes in which to perform a measurement. The one or more measurement modes may be selected based on: whether criteria is met for relaxed monitoring of a neighbor cell; and whether the wireless device is configured to perform a positioning measurement. The processing circuitry may also be configured to perform the measurement in the one or more selected measurement modes.

BRIEF DESCRIPTION OF THE DRAWINGS

FIG. 3 is a logic flow diagram of a method performed by a network node according to some embodiments.

DETAILED DESCRIPTION

Figure 1:
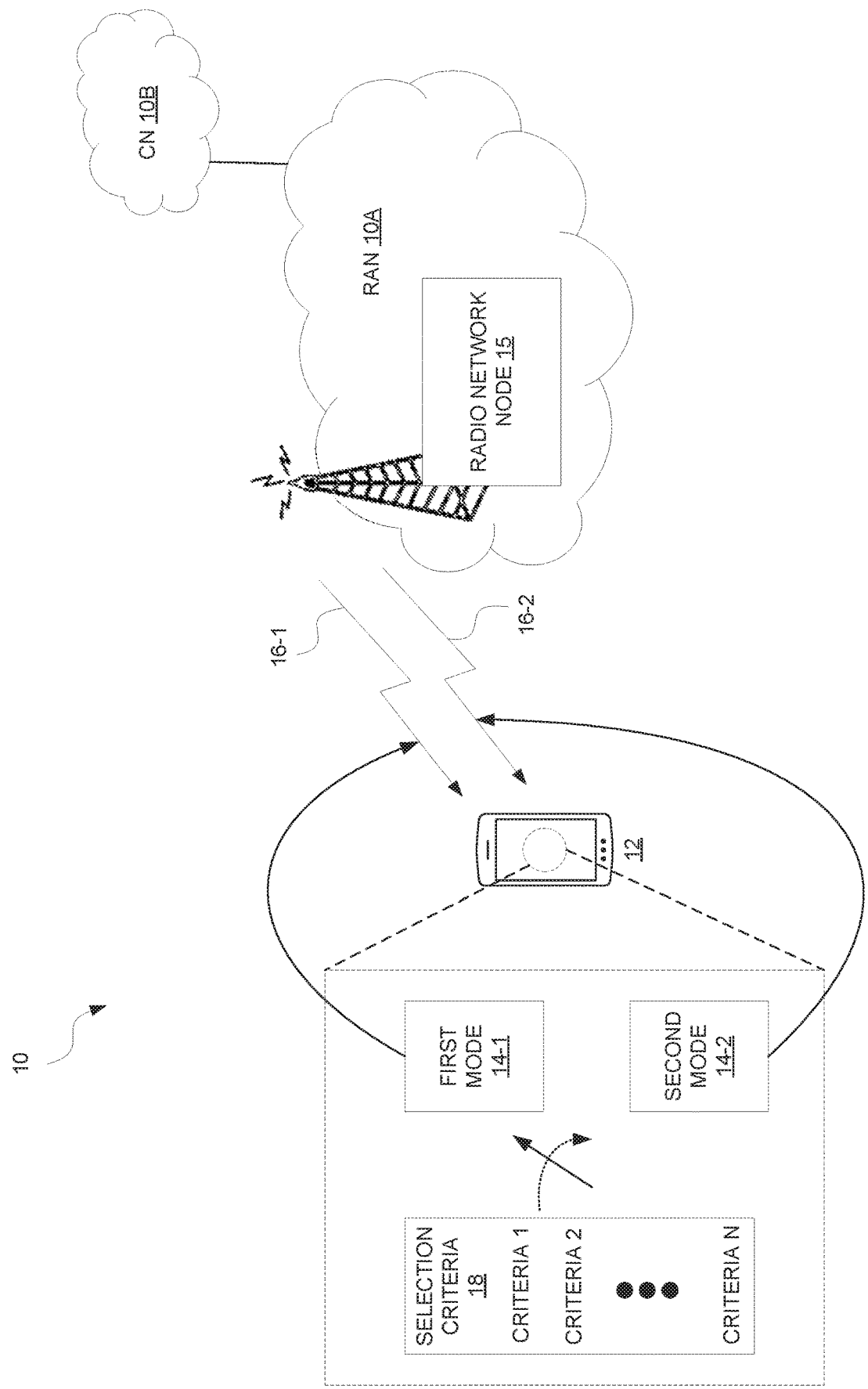
FIG. 1 is a block diagram of a wireless communication system according to some embodiments.

FIG. 1 shows a wireless communication system 10 (e.g., a Narrowband Internet-of-Things, NB-IoT, system) according to some embodiments. The system 10 includes a radio access network (RAN) 10A and a core network (CN) 10B. The RAN 10A provides radio access to one or more wireless devices and provides a connection to the CN 10B, The wireless devices may be NB-IoT devices in one example. The CN 10B in turns connects to one or more external networks, such as the Internet.

FIG. 1 illustrates one such wireless device 12, e.g., an NB-IoT device. The wireless device 12 is configured to perform one or more measurements, e.g., radio resource measurements (RRM) or mobility measurements. The one or more measurements may more specifically include a reference signal received power (RSRP) measurement, a reference signal received quality (RSRQ) measurement, a signal-to-interference-plus-noise (SINR) measurement, a path loss measurement, or the like.

The wireless device 12 in particular is configured with or otherwise supports multiple measurement modes, including a first measurement mode 14-1 and a second measurement mode 14-2. In some embodiments, measurements performed in the different measurement modes are performed on cells belonging to different respective carriers, e.g., as provided by the same radio network node 15 or different radio network nodes. As shown, for instance, measurements performed in the first mode 14-1 are performed on cells belonging to a first carrier 16-1, and measurements performed in the second mode 14-2 are performed on cells belonging to a second carrier 16-1.

In one example, the first carrier 16-1 is an anchor carrier, e.g., in an NB-IoT system and the second carrier 16-2 is a non-anchor carrier. In such embodiments, an anchor carrier may be a carrier on which System Information is broadcast and a non-anchor carrier may be a carrier on which System Information is not broadcast.

Some embodiments herein specify certain conditions or criteria 18 that govern in which of the different measurement modes (e.g., including the first and second modes 14-1, 14-2) the wireless device 12 performs a measurement. In one or more embodiments where the measurement modes dictate or are otherwise associated with performance of the measurement on different carriers 16-1, 16-2 (e.g., anchor vs. non-anchor), the certain conditions or criteria 18 may effectively govern on which carrier 16-1, 16-2 the wireless device 12 performs a measurement.

In these and other embodiments, the conditions or criteria 18 may relate to two or more of; mobility or channel conditions of the device 12, a transmit power difference between the carriers 16-1, 16-2, whether the device 12 is already configured to perform another measurement on one of the carriers 16-1, 16-2, a frequency difference between the carriers 16-1, 16-2, and times at which a signal or channel to be measured is transmitted on the carriers 16-1, 16-2.

The information related to mobility of, or channel conditions of, the wireless device 12 may include one or more of; subscription information indicating whether the wireless device 12 is a stationary device; a parameter indicating a mobility state of the wireless device 12; a Doppler spread of a signal transmitted or received by the wireless device 12; a change in a measurement performed by the wireless device 12 on a cell; and whether criteria is met for relaxing how often the wireless device 12 is to perform measurements on a neighbor cell. Alternatively or additionally, the one or more other measurements may include positioning measurements such that the one or more measurement modes are selected based on which of the first and second carriers 16-1, 16-2 the wireless device 12 is already configured to perform one or more positioning measurements on.

In some embodiments, the wireless device 12 is allowed to perform the measurement in the second mode 14-2 or on the second carrier 16-2 (e.g., non-anchor carrier) if at least two of the certain conditions or criteria 18 are met. In some embodiments, this means that the wireless device 12 is permitted to perform the measurement in at least the second mode 14-2, i.e., the device 12 is permitted to perform the measurement in only the second mode 14-2, only the first mode 14-1, or both the first and second modes 14-1, 14-2. Otherwise, if zero or only one of the certain conditions or criteria 18 are met, the device 12 is not allowed to perform the measurement in that second 14-2 mode or on that second carrier 16-2. In this case, then, the device 12 is permitted to perform the measurement in only the first mode 14-1, and is not permitted to perform the measurement in the second mode 14-2.

In these embodiments, the selection criteria may include two or more of: the information indicating the mobility or channel conditions of the wireless device 12 are changing by less than a threshold amount; the difference between said powers is less than a threshold power difference; the wireless device 12 is already configured to perform one or more other measurements of a certain type on the second carrier; the difference between the frequencies is less than a threshold frequency difference; and the signal or channel to be measured is transmitted on the second carrier with at least a certain periodicity and/or in at least a certain number of transmission time intervals.

Note that, in some embodiments, the wireless device 12 autonomously selects from among the measurement modes 14-1, 14-2 based on its own evaluation of the selection criteria 18. The wireless device 12 in some embodiments is configured to perform that selection only upon permission from a radio network node 15, i.e., permitting the wireless device 12 to use the second mode 14-2, In other embodiments, the wireless device 12 may receive control signaling (not shown) from the radio network node 15 indicating one or more measurement modes in which the wireless device 12 is to perform the measurement. In these embodiments, then, the radio network node 15 may be the entity that selects from the measurement modes as described above. The radio network node's selection in such cases may additionally be based on network-side information, such as historical performance of the first and second measurement modes 14-1, 14-2.

Figure 2:
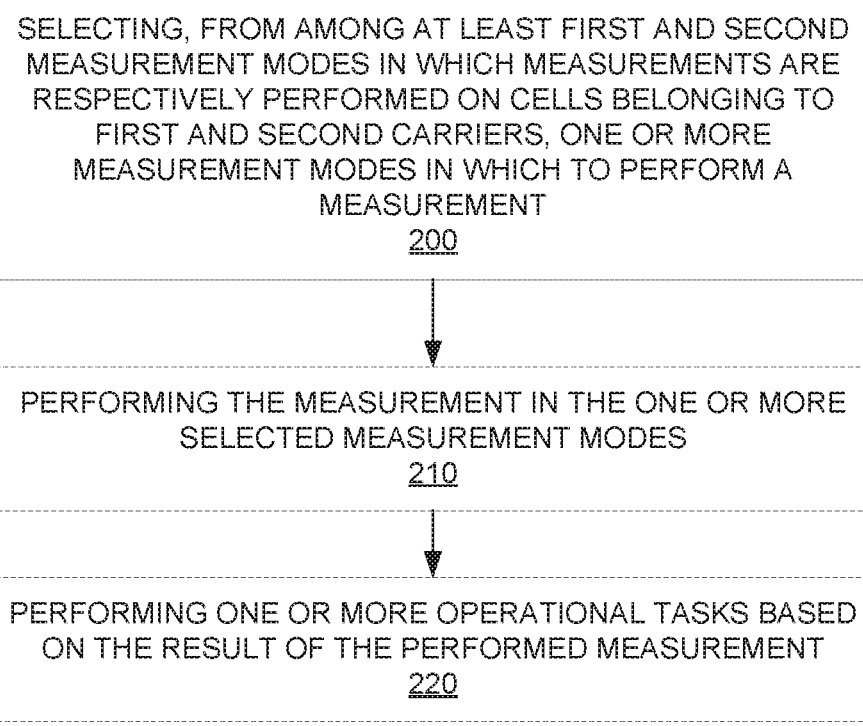
FIG. 2 is a logic flow diagram of a method performed by a wireless device according to some embodiments.

In view of the above, FIG. 2 depicts a method performed by a wireless device 12 in accordance with particular embodiments. The method includes selecting, from among at least first and second measurement modes 14-1, 14-2 in which measurements are respectively performed on cells belonging to first and second carriers 16-1, 16-2, one or more measurement modes in which to perform a measurement (Block 200), In one embodiment, for example, the first carrier 16-1 is an anchor carrier and the second carrier 16-2 is a non-anchor carrier, e.g., in an NB-IoT system such that the first and second carriers 16-1, 16-2 are each an NB-IoT carrier, Regardless, in some embodiments, the one or more measurement modes are selected based on two or more criteria.

In some embodiments, for example, the two or more criteria may include two or more of: information related to a mobility of, or channel conditions of, the wireless device 12; a difference between powers at which a signal or channel to be measured is respectively transmitted on the first and second carriers 16-1, 16-2; which of the carriers the wireless device 12 is already configured to perform one or more other measurements on, one or more types of the one or more other measurements, and/or one or more priorities of the one or more other measurements; a difference between frequencies of the first and second carriers 16-1, 16-2; and times at which a signal or channel to be measured is respectively transmitted on the first and second carriers 16-1, 16-2.

In some embodiments, the information related to mobility of, or channel conditions of, the wireless device 12 includes one or more of; subscription information indicating whether the wireless device 12 is a stationary device; a parameter indicating a mobility state of the wireless device 12; a Doppler spread of a signal transmitted or received by the wireless device 12; a change in a measurement performed by the wireless device 12 on a cell; and whether criteria is met for relaxing how often the wireless device 12 is to perform measurements on a neighbor cell.

In some embodiments, the one or more other measurements include positioning measurements such that the one or more measurement modes are selected based on which of the first and second carriers 16-1, 16-2 the wireless device 12 is already configured to perform one or more positioning measurements on.

In some embodiments, then, the one or more measurement modes are selected based on (i) whether criteria is met for relaxed monitoring of a neighbor cell; and (ii) whether the wireless device 12 is configured to perform one or more particular types of measurements, e.g., whether the wireless device 12 is configured to perform a positioning measurement. In some embodiments, the relaxed monitoring of the neighbor cell relaxes how often the wireless device 12 is to perform measurements on the neighbor cell.

In some embodiments, the second measurement mode 14-2 is selectable only if two or more of multiple selection criteria are met. Alternatively or additionally, the first measurement mode 14-1 may be selected if zero or only one of the multiple selection criteria are met. In either or both of these embodiments, the selection criteria may include two or more of: the information indicates the mobility or channel conditions of the wireless device 12 are changing by less than a threshold amount; the difference between said powers is less than a threshold power difference; the wireless device 12 is already configured to perform one or more other measurements of a certain type on the second carrier 16-2; the difference between the frequencies is less than a threshold frequency difference; and the signal or channel to be measured is transmitted on the second carrier 16-2 with at least a certain periodicity and/or in at least a certain number of transmission time intervals.

Regardless, in some embodiments, the method may also include performing the measurement in the one or more selected measurement modes (Block 210). In one or more embodiments, the method may further include performing one or more operational tasks based on the result of the performed measurement (Block 220).

In some embodiments, the first and second carriers 16-1, 16-2 are each a Narrowband Internet-of-Things (NB-IoT) carrier.

FIG. 3 depicts a method performed by a network node (e.g., a radio network node 15) in accordance with other particular embodiments. The method includes selecting, from among at least first and second measurement modes 14-1, 14-2 in which measurements are respectively performed on cells belonging to first and second carriers 16-1, 16-2, one or more measurement modes in which a wireless device 12 is to perform or is allowed to perform a measurement (Block 300). In one embodiment, for example, the first carrier 16-1 is an anchor carrier and the second carrier 16-2 is a non-anchor carrier, e.g., in an NB-IoT system. In some embodiments, the one or more measurement modes are selected based on two or more criteria.

In some embodiments, for example, the two or more criteria may include two or more of: information related to a mobility of, or channel conditions of, the wireless device 12; a difference between powers at which a signal or channel to be measured is respectively transmitted on the carriers 16-1, 16-2; which of the carriers 16-1, 16-2 the wireless device 12 is already configured to perform one or more other measurements on, one or more types of the one or more other measurements, and/or one or more priorities of the one or more other measurements; a difference between frequencies of the carriers 16-1, 16-2; times at which a signal or channel to be measured is respectively transmitted on the carriers 16-1, 16-2; and historical performance of the first and second measurement modes 14-1, 14-2.

In some embodiments, the information related to mobility of, or channel conditions of, the wireless device 12 includes one or more of: subscription information indicating whether the wireless device 12 is a stationary device; a parameter indicating a mobility state of the wireless device 12; a Doppler spread of a signal transmitted or received by the wireless device 12; a change in a measurement performed by the wireless device 12 on a cell; and whether criteria is met for relaxing how often the wireless device 12 is to perform measurements on a neighbor cell.

In some embodiments, the one or more other measurements include positioning measurements such that the one or more measurement modes are selected based on which of the first and second carriers 16-1, 16-2 the wireless device 12 is already configured to perform one or more positioning measurements on.

In some embodiments, the second measurement mode 14-2 is selectable only if two or more of multiple selection criteria are met. Alternatively or additionally, the first measurement mode 14-1 may be selected if zero or only one of the multiple selection criteria are met. In either or both of these embodiments, the selection criteria may include two or more of: the information indicates the mobility or channel conditions of the wireless device 12 are changing by less than a threshold amount; the difference between said powers is less than a threshold power difference; the wireless device 12 is already configured to perform one or more other measurements of a certain type on the second carrier 16-2; the difference between the frequencies is less than a threshold frequency difference; and the signal or channel to be measured is transmitted on the second carrier 16-2 with at least a certain periodicity and/or in at least a certain number of transmission time intervals.

In some embodiments, the first and second carriers 16-1, 16-2 are each a Narrowband Internet-of-Things (NB-IoT) carrier.

Regardless, the method in some embodiments may further include transmitting, to the wireless device 12, control signaling indicating the one or more selected measurement modes (Block 310).

Figure 4:
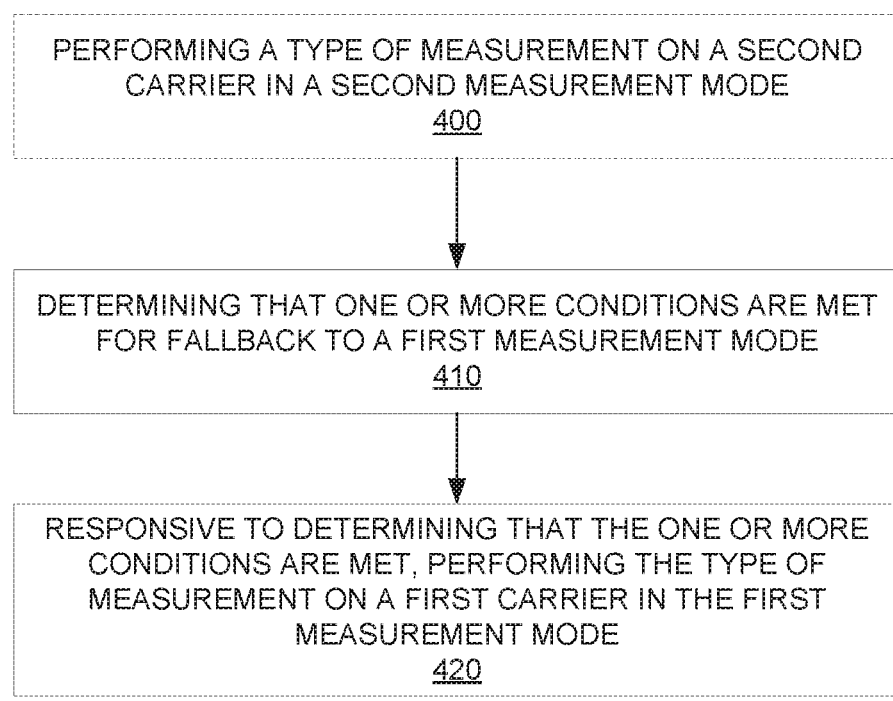
FIG. 4 is a logic flow diagram of a method performed by a wireless device according to other embodiments.

FIG. 4 depicts a method performed by a wireless device in accordance with other particular embodiments. The method as shown includes performing a type of measurement on a second carrier 16-2 in a second measurement mode 14-2 (Block 400). The second carrier 16-2 may for instance be a non-anchor carrier, e.g., in an NB-IoT system. The method may further include determining that one or more conditions are met for fallback to a first measurement mode 14-1 (Block 410), The method may then include, responsive to determining that the one or more conditions are met, performing the type of measurement on a first carrier 16-1 in the first measurement mode 14-1 (Block 420).

In some embodiments, for example, the one or more conditions may include one or more of; the second carrier 16-2 being deactivated or unavailable; a signal or channel on which the type of measurement is performed on the second carrier 16-2 is disabled; and control signaling received from a network node indicating that the wireless device 12 is to or is allowed to perform fallback to the first measurement mode 14-1. Alternatively or additionally, the one or more conditions may include zero or only one of multiple selection criteria 18 being met. The selection criteria 18 may include two or more of: information indicating mobility or channel conditions of the wireless device 12 are changing by less than a threshold amount; a power difference being less than a threshold power difference, wherein the power difference is a difference between powers at which a signal or channel to be measured is respectively transmitted on the first and second carriers 16-1, 16-2; the wireless device 12 is already configured to perform one or more other measurements of a certain type on the second carrier 16-2, a frequency difference is less than a threshold frequency difference, wherein the frequency difference is a difference between frequencies of the first and second carriers 16-1, 16-2; and a signal or channel to be measured is transmitted on the second carrier 16-2 with at least a certain periodicity and/or in at least a certain number of transmission time intervals.

In some embodiments, the first and second carriers 16-1, 16-2 are each a Narrowband Internet-of-Things (NB-IoT) carrier.

In some embodiments, the method further comprises transmitting, to a network node, control signaling indicating either that the wireless device 12 is unable to perform the type of measurement in the second measurement mode 14-2 on the second carrier 16-2 or that the wireless device 12 requests permission to perform fallback to the first measurement mode 14-1. In this case, the method may also comprise receiving, from the network node, control signaling indicating that the wireless device 12 is to or is allowed to perform fallback to the first measurement mode 14-1.

Figure 5:
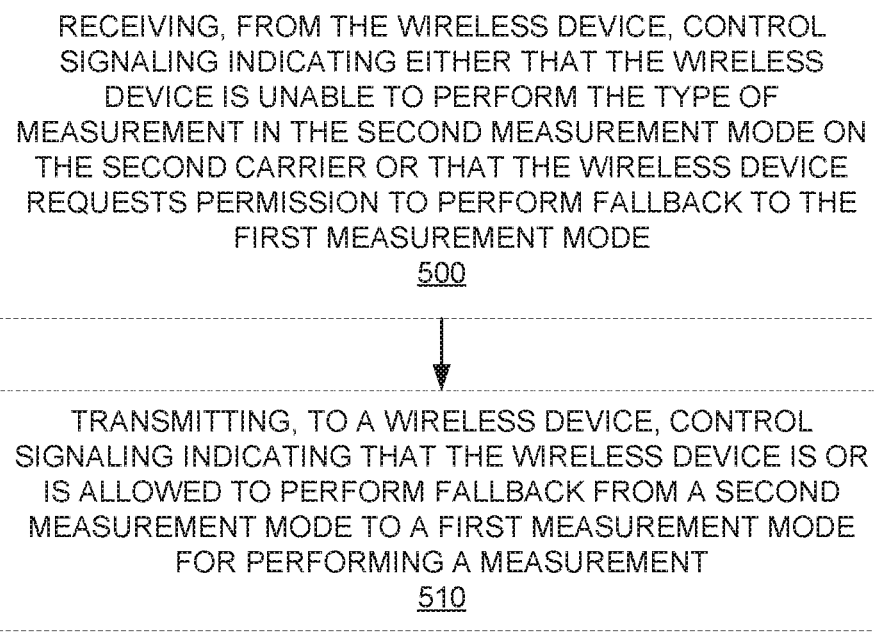
FIG. 5 is a logic flow diagram of a method performed by a network node according to other embodiments.

FIG. 5 depicts a method performed by a network node (e.g., a radio network node 15) in accordance with other particular embodiments. The method includes transmitting, to a wireless device 12, control signaling indicating that the wireless device 12 is or is allowed to perform fallback from a second measurement mode 14-2 to a first measurement mode 14-1 for performing a measurement (Block 510). In some embodiments, the first and second measurement modes 14-1, 14-2 are modes in which a measurement is to be respectively performed on cells belonging to first and second carriers 16-1, 16-2. In one or more embodiments, this transmission may be performed responsive to receiving, from the wireless device 12, control signaling indicating either that the wireless device 12 is unable to perform the type of measurement in the second measurement mode 14-2 on the second carrier 16-2 or that the wireless device 12 requests permission to perform fallback to the first measurement mode 14-1 (Block 500).

Embodiments herein also include corresponding apparatuses, Embodiments herein for instance include a wireless device 12 configured to perform any of the steps of any of the embodiments described above for the wireless device 12.

Embodiments also include a wireless device 12 comprising processing circuitry and power supply circuitry. The processing circuitry is configured to perform any of the steps of any of the embodiments described above for the wireless device 12. The power supply circuitry is configured to supply power to the wireless device 12.

Embodiments further include a wireless device 12 comprising processing circuitry. The processing circuitry is configured to perform any of the steps of any of the embodiments described above for the wireless device 12. In some embodiments, the wireless device 12 further comprises communication circuitry.

Embodiments further include a wireless device 12 comprising processing circuitry and memory. The memory contains instructions executable by the processing circuitry whereby the wireless device 12 is configured to perform any of the steps of any of the embodiments described above for the wireless device 12.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node 15 configured to perform any of the steps of any of the embodiments described above for the radio network node.

Embodiments also include a radio network node 15 comprising processing circuitry and power supply circuitry. The processing circuitry is configured to perform any of the steps of any of the embodiments described above for the radio network node 15. The power supply circuitry is configured to supply power to the radio network node 15.

Embodiments further include a radio network node 15 comprising processing circuitry. The processing circuitry is configured to perform any of the steps of any of the embodiments described above for the radio network node 15. In some embodiments, the radio network node 15 further comprises communication circuitry.

Embodiments further include a radio network node 15 comprising processing circuitry and memory. The memory contains instructions executable by the processing circuitry whereby the radio network node 15 is configured to perform any of the steps of any of the embodiments described above for the radio network node 15.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 6:
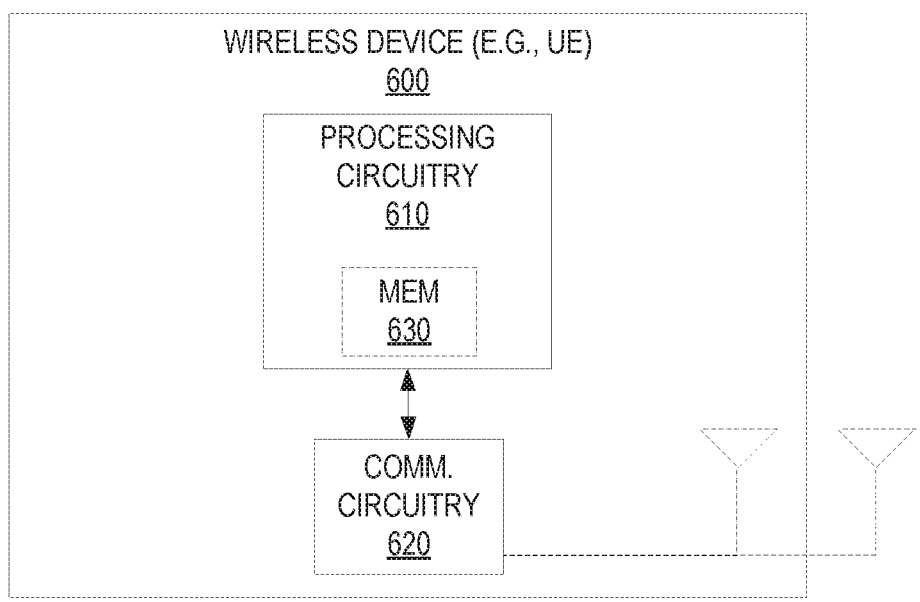
FIG. 6 is a block diagram of a wireless device according to some embodiments.

FIG. 6 for example illustrates a wireless device 600 (e.g., wireless device 12) as implemented in accordance with one or more embodiments. As shown, the wireless device 600 includes processing circuitry 610 and communication circuitry 620. The communication circuitry 620 (e.g., radio circuitry) is configured to transmit and/or receive information to and/or from one or more other nodes, e.g., via any communication technology, Such communication may occur via one or more antennas that are either internal or external to the wireless device 600. The processing circuitry 610 is configured to perform processing described above, e.g., in FIG. 2 and/or FIG. 4, such as by executing instructions stored in memory 630. The processing circuitry 610 in this regard may implement certain functional means, units, or modules.

Figure 7:
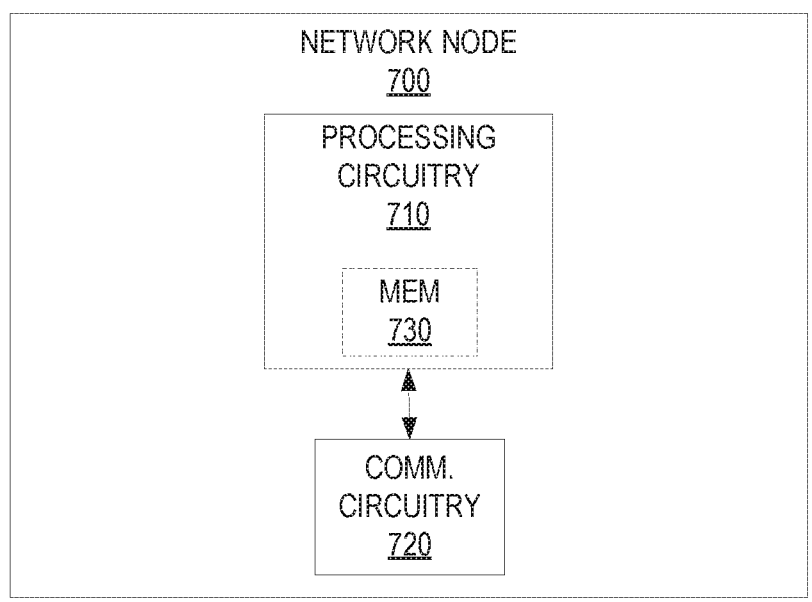
FIG. 7 is a block diagram of a network node according to some embodiments.

FIG. 7 illustrates a network node 700 (e.g., radio network node 15) as implemented in accordance with one or more embodiments. As shown, the network node 700 includes processing circuitry 710 and communication circuitry 720. The communication circuitry 720 is configured to transmit and/or receive information to and/or from one or more other nodes, e.g., via any communication technology. The processing circuitry 710 is configured to perform processing described above, e.g., in FIG. 3 and/or FIG. 5, such as by executing instructions stored in memory 730. The processing circuitry 710 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described. In some embodiments below, the first measurement mode 14-1 may correspond to ModeA described below, the first carrier 16-1 may correspond to Carrier A (e.g., an anchor carrier), the second measurement mode 14-2 may correspond to ModeB, and/or the second carrier 16-2 may correspond to Carrier B (e.g., a non-anchor carrier). Alternatively or additionally, the wireless device 12 discussed above may be referred to as a UE.

Radio measurements done by a user equipment (UE) are typically performed on the serving as well as on neighbour cells (e.g. narrowband, NB, cells, NB physical resource blocks, PRBs, etc.) over some known reference symbols or pilot sequences e.g. NB Cell-specific Reference Signal (NB-CRS), NB Secondary Synchronization Signal (NB-SSS), NB Primary Synchronization Signal (NB-PSS), etc. The measurements are done on cells on an intra-frequency carrier, inter-frequency carrier(s) as well as on inter radio access technology (inter-RAT) carriers(s) (depending upon the UE capability whether it supports that RAT). To enable inter-frequency and inter-RAT measurements for the UE requiring gaps, the network has to configure the measurement gaps.

The measurements are done for various purposes. Some example measurement purposes are: mobility, positioning, self-organizing network (SON), minimization of drive tests (MDT), operation and maintenance (O&M), network planning and optimization etc. Examples of measurements in Long Term Evolution (LTE) are Cell identification (aka physical cell identity, PCI, acquisition), Reference Symbol Received Power (RSRP), Reference Symbol Received Quality (RSRQ), cell global ID (CGI) acquisition, Reference Signal Time Difference (RSTD), UE RX-TX time difference measurement, Radio Link Monitoring (RLM), which consists of Out of Synchronization (out of sync) detection and In Synchronization (in-sync) detection etc, Channel state information (CSI) measurements performed by the UE are used for scheduling, link adaptation etc. by network. Examples of CSI measurements or CSI reports are channel quality indicator (CQI), precoding matrix indicator (PMI), radio indication (RI), etc, They may be performed on reference signals like CRS, CSI reference signal (CSI-RS) or demodulation reference signal (DMRS).

In order to identify an unknown cell (e.g. new neighbor cell), the UE has to acquire the timing of that cell and eventually the physical cell ID (PCI). In legacy LTE operation, the downlink (DL) subframe #0 and subframe #5 carry synchronization signals (i.e. both PSS and SSS). The synchronization signals used for NB-IOT are known as NB-PSS and NB-SSS and their periodicity may be different from the LTE legacy synchronization signals. This is called as cell search or cell identification. Subsequently the UE also measures RSRP and/or RSRQ of the newly identified cell in order to use itself and/or report the measurement to the network node. In total there are 504 Pas in NB-IoT RAT. The cell search is also a type of measurement. The measurements are done in all radio resource control (RRC) states i.e, in RRC idle and connected states. In RRC connected state, the measurements are used by the UE for one or more tasks such as for reporting the results to the network node. In RRC idle the measurements are used by the UE for one or more tasks such as for cell selection, cell reselection etc.

The objective of Narrow Band Internet of Things (NB-IOT) is to specify a radio access for cellular Internet of things (IOT), based to a great extent on a non-backward-compatible variant of E-UTRA, that addresses improved indoor coverage, support for massive number of low throughput devices, low delay sensitivity, ultra-low device cost, low device power consumption and (optimized) network architecture.

The NB-IOT carrier BW (Bw2) is 200 KHz. Examples of operating bandwidth (Bw1) of LTE are 1.4 MHz, 3 MHz, 5 MHz, 10 MHz, 15 MHz, 20 MHz etc.

NB-IoT supports 3 different deployment scenarios. 'Stand-alone operation' is a first scenario that utilizes for example the spectrum currently being used by GERAN systems as a replacement of one or more GSM carriers. In principle it operates on any carrier frequency which is neither within the carrier of another system not within the guard band of another system's operating carrier. The other system can be another NB-IOT operation or any other RAT e.g. LTE.

'Guard band operation' is a second scenario that utilizes the unused resource blocks within a LTE carrier's guard-band. The term guard band may also be interchangeably called as guard bandwidth. As an example in case of LTE BW of 20 MHz (i.e. Bw1=20 MHz or 100 resource blocks, RBs), the guard band operation of NB-IOT can be place anywhere outside the central 18 MHz but within 20 MHz LTE BW.

'In-band operation' is a third scenario that utilizes resource blocks within a normal LTE carrier. The in-band operation may also interchangeably be called in-bandwidth operation. More generally, the operation of one RAT within the BW of another RAT is also called as in-band operation. As an example in a LTE BW of 50 RBs (i.e. Bw1=10 MHz or 50 RBs), NB-IOT operation over one resource block (RB) within the 50 RBs is called in-band operation.

In NB-IOT, the downlink transmission is based on orthogonal frequency division multiplexing (OFDM) with 15 kHz subcarrier spacing and the same symbol and cyclic prefix durations as for legacy LTE for all the scenarios: standalone, guard-band, and in-band. For uplink (UL) transmission, both multi-tone transmissions based with a 15 kHz subcarrier spacing on single carrier frequency division multiple access (SC-FDMA), and single tone transmission, with either 3.75 kHz or 15 kHz subcarrier spacing, is supported This means that the physical waveforms for NB-IoT in downlink and also partly in uplink are similar to legacy LTE.

In the downlink design, NB-IoT supports both master information broadcast and system information broadcast which are carried by different physical channels. For in-band operation, it is possible for NB-IoT UE to decode the narrowband physical broadcast channel (NPBCH) without knowing the legacy PRB index. NB-IoT supports both downlink physical control channel (NPDCCH) and downlink physical shared channel (NPDSCH). The operation mode of NB-IOT must be indicated to the UE, and currently 3GPP considers indication by means of NSSS, NB-MIB or perhaps other downlink signals.

Anchor Carrier and Non-Anchor Carrier in NB-IoT

In current specifications for NB-IoT, anchor and non-anchor carriers are defined. In the anchor carrier, the UE assumes that NPSSINSSS/NPBCH/SIB-NB are transmitted on downlink. In the non-anchor carrier, the UE does not assume that NPSSINSSS/NPBCH/SIB-NB are transmitted on downlink. The anchor carrier is transmitted on subframes #0, #4, #5 in every frame and subframe #9 in every other frame. The anchor carriers transmitting NPBCH/SIB-NB contains also narrowband reference signal (NRS). The non-anchor carrier contains NRS during certain occasions and UE specific signals such as NPDCCH and NPDSCH. The non-anchor carrier can be transmitted in any subframe other than those containing the anchor carrier. The resources for non-anchor carrier are configured by the network node. For example, the eNB signals a bit map of DL subframes using information element (1E) (DL-Bitmap-NB) which are configured as non-anchor carrier. The anchor carrier and/or non-anchor carrier may typically be operated by the same network node e.g. by the serving cell. But the anchor carrier and/or non-anchor carrier may also be operated by different network nodes. The configuration of the non-anchor carriers is signaled to the UE via RRC message as defined in TS 36.331 version 13.2.0 as described below, If the relaxed monitoring criterion has not been met for $T_{SearchDeltaP}$:
the UE shall set the value of $Srxlev_{Ref}$ to the current Srxlev value of the serving cell;
$T_{SearchDeltaP}$=5 minutes, or the eDRX cycle length if eDRX is configured and the eDRX cycle length is longer than 5 minutes.

---

```
- CarrierConfigDedicated-NB
The IE CarrierConfigDedicated-NB is used to specify a non-anchor carrier in NB-
IoT.
                    CarrierConfigDedicated-NB information elements
-- ASN1START
CarrierConfigDedicated-NB-r13 ::=        SEQUENCE {
    dl-CarrierConfig-r13                 DL-CarrierConfigDedicated-NB-r13,
    ul-CarrierConfig-r13                 UL-CarrierConfigDedicated-NB-r13
}
DL-CarrierConfigDedicated-NB-r13 ::=     SEQUENCE {
    dl-CarrierFreq-r13                   CarrierFreq-NB-r13,
    downlinkBitmapNonAnchor-r13          CHOICE {
        useNoBitmap-r13                      NULL,
        useAnchorBitmap-r13                  NULL,
        explicitBitmapConfiguration-r13      DL-Bitmap-NB-r13,
        spare                                NULL
    } OPTIONAL,              -- Need ON
    dl-GapNonAnchor-r13                  CHOICE {
        useNoGap-r13                         NULL,
        useAnchorGapConfig-r13               NULL,
        explicitGapConfiguration-r13         DL-GapConfig-NB-r13,
        spare                                NULL
    } OPTIONAL,              -- Need ON
    inbandCarrierInfo-r13                SEQUENCE {
        samePCI-Indicator-r13                CHOICE {
            samePCI-r13                          SEQUENCE {
                indexToMidPRB-r13                    INTEGER (-55..54)
            },
            differentPCI-r13                     SEQUENCE {
                eutra-NumCRS-Ports-r13               ENUMERATED {same, four}
            }
        }                                OPTIONAL          -- Cond anchor-guardband
        eutraControlRegionSize-r13       ENUMERATED {n1, n2, n3}
    }                                    OPTIONAL          -- Cond non-anchor-inband
    ...
}
UL-CarrierConfigDedicated-NB-r13 ::= SEQUENCE {
    ul-CarrierFreq-r13          CarrierFreq-NB-r13          OPTIONAL,  -- Need OP
    ...
}
```

---

Relaxed Monitoring Criteria for a Cell

The relaxed monitoring criteria for a neighbor cell are specified in TS 36.304 v15.2.0.

When the UE is required to perform intra-frequency or inter-frequency measurement, the UE may choose not to perform intra-frequency or inter-frequency measurements when;

The relaxed monitoring criterion is fulfilled for a period of $T_{SearchDeltaP}$, and Less than 24 hours have passed since measurements for cell reselection were last performed, and The UE has performed intra-frequency or inter-frequency measurements for at least $T_{SearchDeltaP}$ after selecting or reselecting a new cell.

The relaxed monitoring criterion is fulfilled when:

$$(Srxlev_{Ref} - Srxlev) < S_{SearchDeltaP}$$

Where:
Srxlev=current Srxlev value of the serving cell (dB).
$Srxlev_{Ref}$=reference Srxlev value of the serving cell (dB), set as follows; After selecting or reselecting a new cell, or
If $(Srxlev - Srxlev_{Ref}) > 0$, or There currently exist certain challenge(s). According to the current 3GPP specification, the radio resource management (RRM) measurements for category NB1/NB2 UEs are performed on the anchor carrier where physical channels and signals such as NPSS/NSSS/NPBCH/SIB-NB are transmitted. In multicarrier operation, the UE can be configured to receive paging, control channel and data channels on the non-anchor carrier. However, the UE still needs to retune to the anchor carrier on periodic basis to receive the synchronization signals, and to perform RRM measurements. The synchronization signals are used to perform neighbor cell detection, and they are only transmitted on the anchor-carrier. Currently, RRM measurements are performed on the anchor carrier only because the UE cannot always assume NRS transmission on the non-anchor carrier. Hence, a UE which is configured on a non-anchor carrier for paging and data receptions still needs to switch to the anchor carrier for the reasons explained above and this is not very efficient from a network resource point of view and UE power consumption point of view. And, even if the UE could assume more frequent NRS transmission on the non-anchor carrier (e.g., all the time), it would not always be appropriate or desirable for the UE to perform RRM measurements on the non-anchor carrier. For example, if a UE bases its RRM measurements on a non-anchor carrier but enters into sleep-mode, by the time the UE wakes up its connection to the non-anchor carrier may have been suddenly lost.

Certain aspects of the present disclosure and their embodiments may provide solutions to these or other challenges. Some embodiments comprise several embodiments for a UE and a network node.

Figure 8:
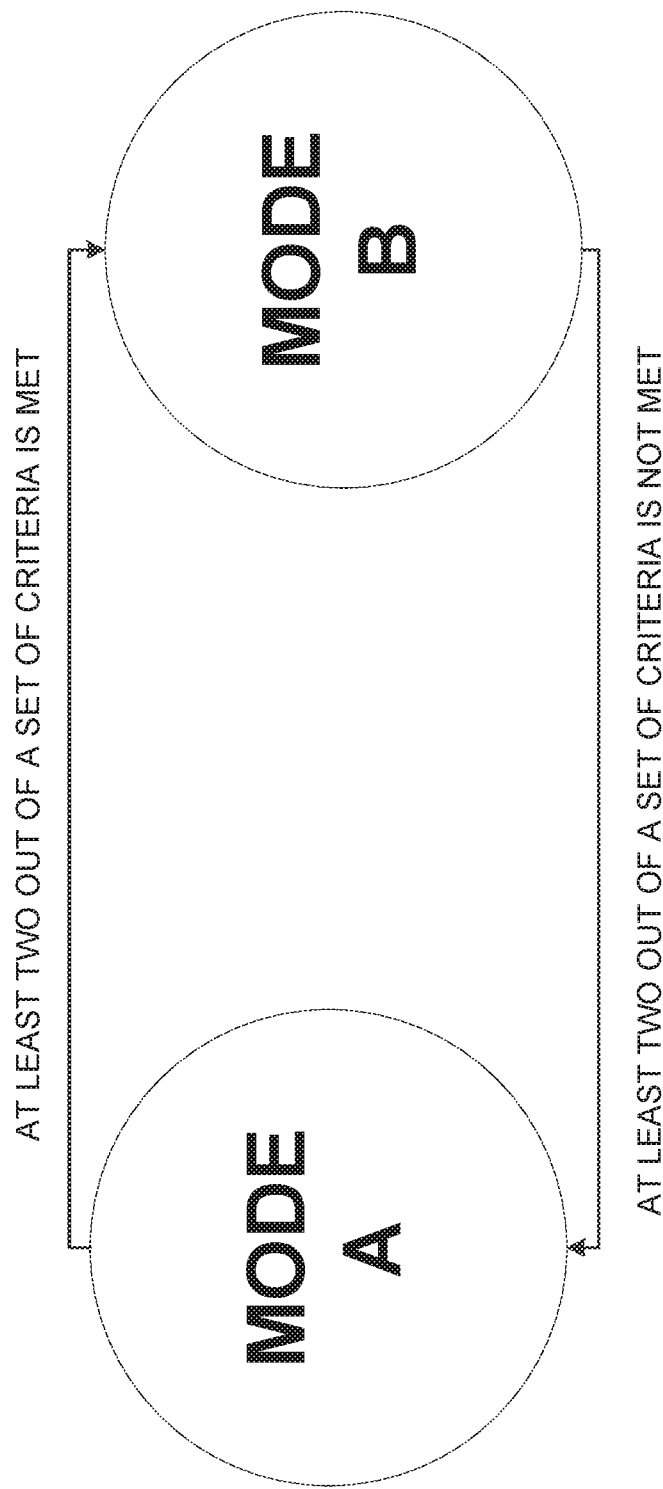
FIG. 8 is a state transition diagram for measurement modes of a wireless device according to some embodiments.

In a first embodiment in the UE, the UE uses a method to select one out of at least two measurement modes. The two modes are called ModeA and ModeB, as illustrated in the state machine of FIG. 8 for transition between the modes. This figure shows two possible states. A UE operating in ModeA can switch to ModeB or vice versa based one or more criteria. ModeA is associated with RRM measurements on at least one cell belonging to carrier A and ModeB is associated with RRM measurements on at least one cell belonging to carrier B. Specific examples of carrier A and carrier B are anchor- and non-anchor carrier respectively in NB-IOT.

In some embodiments, the UE selects one of at least two measurement modes based on at least two out of a set of criteria which constitutes information related to UE mobility, transmit power difference between carrier A and carrier B, whether the UE is configured to perform any positioning measurements on one or more cells of carrier A and/or one or more cells of carrier B and the difference between the carriers (e.g. with respect to their center frequencies) associated with measurement ModeA and measurement ModeB.

Information related to UE mobility may comprise explicit or implicit indication related to UE mobility, e.g. whether it is a stationary UE, mobile UE, UE of moderate speed etc. Example of explicit mobility indication can be a subscription information telling the UE whether it is fixed UE or any other higher-layer parameter indicating mobility state of the UE. Examples of implicit mobility information include UE determining the mobility based on certain criteria, e.g. Doppler estimation, serving cell measurement changes, neighbor cell measurement changes, or whether or not the neighbor cell relaxation criteria (also known as relaxed monitoring criteria) is met. The obtained information related to the power difference indicates whether the transmitted powers of the reference signals used for RRM measurements in carrier A and carrier B are the same or not, or the magnitude of their difference is within a certain margin. For example, the power level information can be received from the network node. In another example, the maximum allowed difference can be pre-defined and the UE can be provided with transmit power levels of reference signals used in cells of carrier A and carrier B. The third type of information is related to whether the UE is expected to perform a certain type of measurement on a certain carrier (F1). Example of such measurements are positioning measurements which typically have high-priority and the positioning signals can be transmitted anywhere within the cell bandwidth. In this case, the UE may still have to switch to that part of the spectrum to measure on the positioning signals. Based on this information, the UE decides which measurement mode to enter and whether the criteria have been met to switch to the other mode.

One advantage of some embodiments herein is that a UE does not have to always switch between the multiple carriers (e.g. between anchor- and non-anchor carriers) only for the measurement purpose. Instead, the UE can sometimes remain configured on the non-anchor carrier and rely on the non-anchor carrier RRM measurement for operational tasks.

In a second embodiment in the network node, the network node determines whether the UE is configured to select between any of the two measurement modes A and B or is configured to apply only one measurement mode (e.g. mode A) for performing measurements. If the UE is configured to select between the two measurement modes, then the network node further obtains information related to the transmit power difference of the reference signals used for the RRM measurements in ModeA (e.g. anchor carrier) and ModeB (e.g. non-anchor carrier) and transmits this information to the UE. In yet another aspect of the second embodiment, the network node may alternatively or additionally configure the UE to perform a certain type of measurement (e.g. positioning measurement) on cells of a particular carrier A or carrier B. The network node may further receive measurement result from the UE which is performed based on the transmit power information signaled to the UE and the mode(s) used by the UE for performing the measurements.

In some embodiments, a UE basing its RRM measurements on non-anchor carrier enters into sleep-mode (e.g., due to eDRX), and by the time it wakes-up its connection to the non-anchor carrier may have been suddenly lost. In this case, the UE according to some embodiments falls back to the anchor carrier.

Certain embodiments may provide one or more of the following technical advantage(s). Some embodiments reduce unnecessary switching between the different carriers in the network. This may in turn conserve UE power consumption and preserve scheduling opportunities that would have otherwise been lost.

First UE Embodiment: Methods for Selecting Measurement Mode

The steps involved in the UE in some embodiments include one or more of:

Step 1: Evaluating at least two of the following four criteria for determining at least one of a plurality of measurement modes for performing one or more measurements: (i) Relaxed monitoring for a cell e.g. relaxed monitoring of neighbor cell(s), (ii) Difference between transmit powers of reference signals associated with different measurement modes with respect to a threshold, (iii) Configuration of particular measurement type(s) e.g. positioning measurements, (iv) Difference between carrier frequencies used for different measurement modes.

Step 2: Selecting a measurement mode based on the evaluated criteria.

Step 3: Using the selected measurement mode for performing one or more measurements.

The steps are described in more detail below.

With regard to the first step, consider some examples of criteria used for evaluation:

Relaxed monitoring of a cell: The UE determines whether the UE is configured with the relaxed monitoring for one or more cells, Examples of cells are serving cell, one or more neighbor cells etc. When the relaxed monitoring is enabled for a cell, then the UE is not required to perform measurement on that cell for a certain time period (e.g. 5 minutes) or until the relaxed monitoring is disabled or de-configured for that cell. One example of criteria for relaxed monitoring is based on the mobility state of the UE. For example, if the UE is stationary then the UE is allowed to enter in the relaxed monitoring for one or more cells e.g. neighbor cells. The UE therefore obtains information related to UE mobility which indicates whether it is a mobile or stationary UE. Such information can be explicit information (e.g. higher layer signaling, or subscription data) indicating the mobility state of the UE, e.g. whether it is stationary or mobile.

It can also be an implicit information indicating the UE mobility. One such example is using of relaxed cell monitoring criterion (as defined in TS 36,306 v15.2.0 and described above) for determining the mobility state of the UE. The relaxed cell monitoring criterion comprises numerous conditions to decide when then the UE can choose not to perform intra-frequency or inter-frequency measurements. The conditions are chosen such that the UE is allowed not to perform intra-frequency and inter-frequency measurements only when the UE has limited mobility e.g. stationary or substantially stationary as described above. When the relaxed monitoring conditions are met, it is an indication that the UE does not move very much, or it can be stationary. Under such circumstances, the UE is required to only measure on the serving cell and it is allowed to skip the neighbor cell measurement. The UE can also obtain this information about the UE mobility state from the other nodes, e.g. network node, signaling the mobility state of the UE.

Magnitude of power difference with respect to a power threshold: The UE compares the magnitude of the difference between the transmit powers of the signals used for measurements using ModeA and ModeB with respect to power threshold (H). As an example, H can be 0 dB. To evaluate this criterion, the UE first obtains information related to the transmit power of the signals and/or channels used for the measurements between ModeA and ModeB, The power threshold used by the UE for comparing the magnitude of the power difference can be pre-defined or configured by the network node. The power used for transmitting the reference signals can be different in ModeA than in ModeB. For example, if ModeA is associated with an anchor-carrier, then power-boosting can be applied on all or specific signals or channels transmitted on that carrier. The power boosting in certain signals implies transmitting with a higher power compared to the power of another signal e.g. by more than X dB. Example of X is 6 dB. In case of NB-IoT, the network can apply power boosting for transmission of synchronization signals (e.g. NPSS, NSSS, NPBCH).

The transmit power information between ModeA and ModeB can be pre-defined in the telecommunication standards specifications, whether transmit power is the same for the carriers associated with ModeA and ModeB, or if they are different the absolute or relative difference can be pre-defined. In another example, the transmit powers of ModeA and/or ModeB can be configurable e.g. signaled by the network node. In this case, the difference can be signaled to the UE which can be part of the broadcast information or dedicated information as part of the setting up of the carrier. In another example, the information about the transmit powers of the signals and channels used for measurements using different measurement modes can be individually signaled to the UE e.g. in system information.

In yet another example, the transmit power of the signals and channels used for measurements between the different measurement modes can be specified using a range. One example is shown below wherein the value of Tr can be pre-defined, or signaled to the UE:

$$|Tx\_ModeA - Tx\_ModeB| \leq Tr \text{ dB}$$

Figure 9:
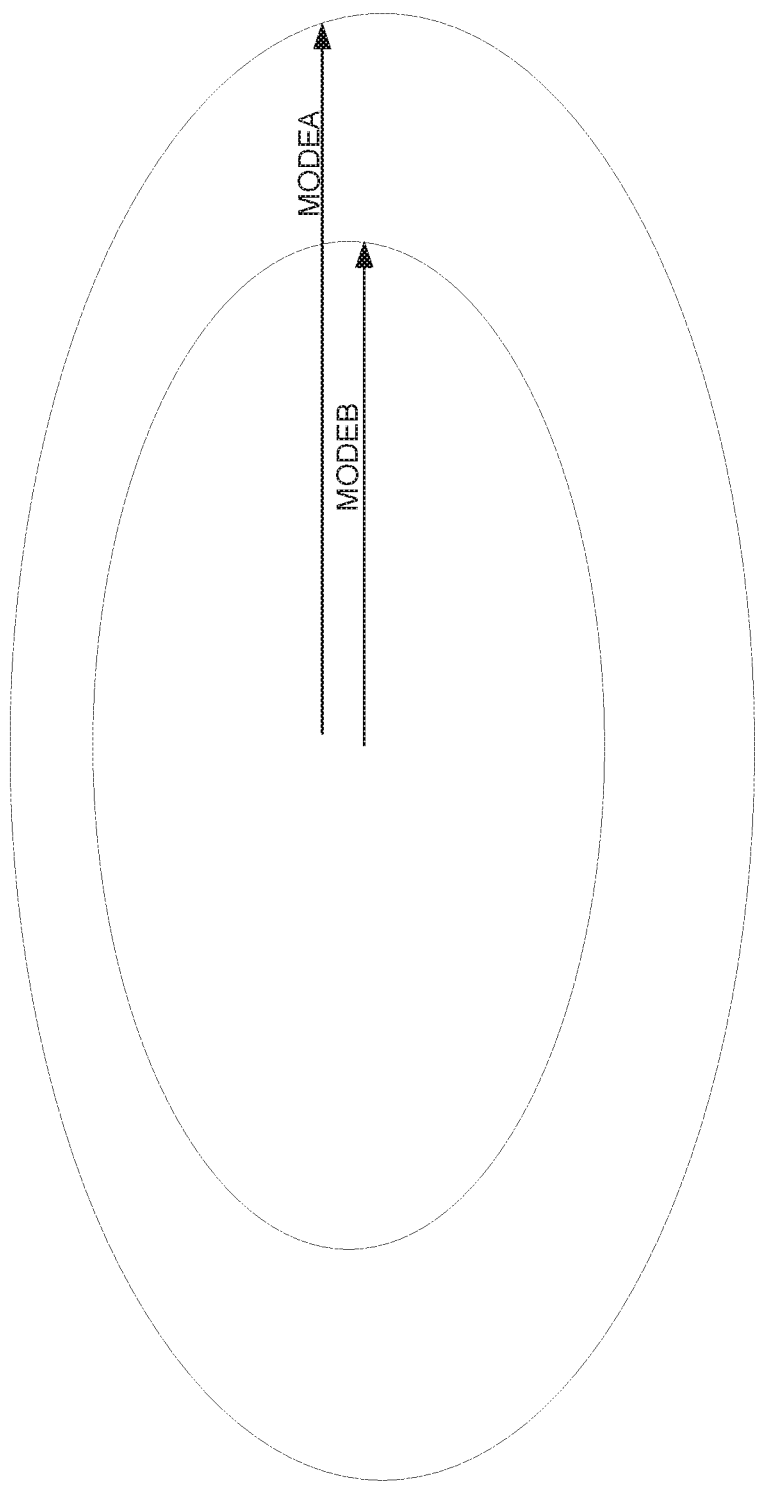
FIG. 9 is a block diagram of coverage levels for different measurement modes according to some embodiments.

In one example, it is assumed that RRM measurements (e.g. NRSRP, NRSRQ) are performed based on NRS signals in ModeA and ModeB and power-boosting is applied only in ModeA, i.e. NRS is transmitted using X dB larger power in ModeA compared to ModeB. This affects the estimated coverage level of the cell as shown in FIG. 9 where it is shown that cell has a larger coverage in ModeA than in ModeB.

Configuration of certain measurement type(s): The UE determines whether the UE is configured to perform one or more particular types of measurements. The UE may further determine whether the UE is configured to perform one or more particular types of measurements using a particular type of measurement mode (e.g. modeA or modeB). One example of particular type of measurement is the measurement performed for particular purpose e.g. positioning etc. Another example of particular type of measurement is the measurement performed using certain types of reference signals e.g. positioning reference signals, SSS etc. Yet another example of particular type of measurement is the measurement performed using particular measurement mode e.g. measurement performed on cells of anchor carrier etc. This is further elaborated with examples below. For example, assume that the UE determines the need to perform a certain measurement type (called herein as first measurements) on a first type of discovery reference signals (DRS1) of one or more cells belonging to a serving carrier (F1). Examples of DRS1 are PRS, CSI-RS etc. The bandwidth of DRS1 is configurable and it is up to the network node whether to transmit DRS1 over a rull or partial BW of the cell. Examples of serving carrier are anchor-carrier, non-anchor carrier, primary carrier or primary component carrier (PCC), secondary component carrier (SCC) etc.

In one example, the determining is based on one or more of: a request to perform such measurements, a request to report such measurements, a request to perform and/or report a result based on such measurements (e.g., cell change, location calculation, etc.), a measurement configuration, etc., which may be received from another node (e.g., a network node) or from a higher layer. In another example, the determining is based on the fact that UE location has changed more than a certain margin compared to a previously determined or known location. In yet another example, the determining can be triggered by a change in UE coverage mode, coverage enhancement level, or change in RRM measurement quality by at least a certain margin.

Examples of the first measurements: positioning measurements such as reference signal time difference (RSTD) measurements, or UE Rx-Tx measurement. Generally, the positioning measurements are more time critical than periodic RRM measurements and therefore have higher priority than any other types of measurements. In the case of NB-IoT RSTD measurement, the NB-IoT positioning reference signal (NPRS) can be transmitted anywhere within the cell bandwidth. This means they can fall outside the frequency location associated with ModeA or ModeB, Because of their higher priority, the UE may have to retune from ModeB to ModeA or any other frequency location and measure on the NPRS. In one specific example, NPRS can be transmitted on the carrier associated with ModeA (e.g. anchor).

Difference between carrier frequencies with respect to frequency threshold: In yet another example of the criterion, the UE may take into account the frequency separation to decide whether to perform measurements only based on ModeA and/or ModeB. The UE is configured with information about the carriers of anchor and non-anchor. Examples of information are frequency channel number, ARFCN, EARFCN etc. Therefore the UE can determine the difference or separation between the two carriers. The difference can be determined between a reference point in both carriers. An example of the reference point is the center frequency of each carrier. For example the UE can compare the difference between the center frequencies of anchor carrier and the non-anchor carrier with a frequency threshold (G). Based on this comparison the UE can decide whether the UE is allowed to perform measurement according to ModeA and/or ModeB.

Based upon NRS Configuration: In yet another example of criteria, the UE evaluates the configuration of NRS configuration in ModeB and decides whether ModeB is applicable or should it only use ModeA, The configuration in some embodiments may comprise the number of subframes that will be used for NRS transmission. Further the configuration may compromise when would the signals or subframes occur (for instance, how many subframes prior to Paging message or WUS etc) and may also compromise the occasion (periodicity). For reliable RRM measurements, it would be needed that there are enough subframes for the UE to compute the signal strength or quality and further these signals are re-occurring at a certain periodicity.

With regard to the second step, the UE selects at least one out of multiple measurement modes based on the evaluation of the criteria described in the first step.

If the UE fulfils at least two criteria (described in step 1), then the UE in some embodiments is allowed to perform a measurement only according to ModeB. As an example, in ModeB the UE performs measurement on signals of cells operating on non-anchor carrier e.g. on NRS on non-anchor carrier. However, the UE may also perform measurement on cells operating on anchor carrier e.g. on SSS, NRS etc transmitted on non-anchor carrier.

If the UE does NOT fulfil at least two criteria (described in step 1), then the UE in some embodiments is NOT allowed to perform measurement according to ModeB. Instead, in this case, the UE is required to perform measurement only according to ModeA. As an example, in ModeB the UE performs measurement on signals of cells operating on anchor carrier e.g. on SSS, NRS on anchor carrier.

In some embodiments, the relaxed monitoring criterion is fulfilled if the UE determines that it is operating in relaxed monitoring for at least one cell e.g. neighbor cell.

In some embodiments, the transmit power difference related criterion is fulfilled if the UE determines that the magnitude of the difference of transmit powers of signals used for measurements using ModeA and ModeB is less than or equal to power threshold.

In some embodiments, the criterion related to a certain measurement type is fulfilled if the UE determines that the UE is configured to performed at least one measurement of the particular type.

In some embodiments, the frequency difference/separation related criterion is fulfilled if the UE determines that the difference between the frequencies/signals (e.g. with respect to their center frequencies) used for measurements using ModeA and ModeB is less than or equal to frequency threshold (G). Examples of G 20 MHz, 10 MHz etc. For example if the carriers associated with measurement ModeA and ModeB are not separated by more than a certain frequency threshold, e.g. X MHz, or if they are within a certain bandwidth, then the UE may choose to only perform measurements based on ModeB. One reason is that if the separation is significant, then the measurement result of ModeB may not reflect the true value of carrier of ModeA.

In some embodiments, the reliability of the measurement is fulfilled if the transmitted NRS configuration is deemed adequate. For example, the UE can estimate the UE measurements reliability. The UE can estimate this based upon whether the transmitted NRS Configuration is adequate, i.e., the number of subframes, periodicity, occurrence etc. is met for RRM.

With regard to Step 3, the UE uses the selected measurement mode (ModeA or ModeB) to perform one or more measurements. Examples of measurements are NRSRP, NRSRQ, SINR, path loss etc.

Although not shown, the method may further include the UE using the results of the performed measurements for carrying out one or more operational tasks. Examples of such tasks are power control, reporting results to network node, random access procedure, etc.

Alternatively or additionally, the UE, prior to evaluating the criteria, may in some embodiments determine whether the UE is even configured to select between a plurality of measurement modes or not. The UE can determine this based on one or more of the following: (i) a pre-defined rule e.g. the UE is allowed to select if the UE is configured with anchor and non-anchor carriers; (ii) information received from the network node e.g. indication about the measurement modes such as mode A and mode B on carrier A and carrier B; and (iii) historical data or statistics e.g. whether the UE has selected between different modes when configured with certain carriers. If the UE is not configured to select between a plurality of measurement modes, the UE may not perform the rest of the method, i.e., may not evaluate the criteria.

Embodiments in the Network Node

Alternatively or additionally to the first embodiment, the network (NW) in the second embodiment may specify which modes UEs are allowed to use based upon one or more criteria. The one or more criteria may include for example:

Performance evaluation of the various Modes used. The NW can evaluate the reliability of measurements based upon the performance of ModeB measurement such as using Paging success rate etc., and other Network key performance indicators (KPIs), including the estimated power saving reports from the UE or based upon some drive test results, Stationary Status obtained from the Core Network Transmit Power and Power boosting applied in various modes Configuration of NRS Frequency Separation between Anchor and non-anchor carrier Based upon Relaxed Monitor enabled/disable status Alternatively or additionally, the network in some embodiments may inform the UE of the decision using System Information broadcast or using dedicated signaling. In some embodiments, the NW can use dedicated signaling to inform the stationary UE about the Modes to use for measurement, where the stationary UEs include the UEs which have been subscribed as stationary UE.

From 3gpp 23.682 Version f50. Section 5.10.1

TABLE 5.10.1-1

| CP parameters | |
| --- | --- |
| 5) Stationary indication | Identifies whether the UE is stationary or mobile [optional] |

FallBack Mechanism

In one embodiment, if a UE using ModeB fails to meet RRM criteria or the NW disables NRS transmission for use by ModeB, the UE does fallback or should fallback to ModeA.

In one of the embodiments, the UE performs RRM measurements associated to least one cell belonging to carrier B which is a non-anchor carrier. At some point, the UE can enter into a sleep mode (e.g., due to eDRX), When the UE wakes up to continue performing measurements on carrier B, carrier B may have been deactivated. In this case, the UE falls back to carrier A (e.g., anchor carrier).

In one of the embodiments, the network informs the UE that carrier B has been deactivated, which message can include a specific order to fallback to carrier A for continuing to perform RRM measurement on that carrier. In one of the embodiments, the UE informs the network about its inability to continue performing RRM measurements, where it requests permission to fallback to carrier A, The network then responds either acknowledging the request or pointing the UE to some other non-anchor carrier.

In any of the above embodiments, the UE may be configured with PCell and PSCell or with PCell, PSCell and one or more SCells such as in dual connectivity and/or carrier aggregation. The configured cells are UE-specific, also known as serving cells of the UE.

The term control signal used herein refer to any physical control channel or any physical signal. A physical control channel comprises of a set of resource elements carrying information originating from higher layers e.g. transport channel, RRC message etc, Examples of downlink control channels are Physical Broadcast Channel (PBCH), Physical Downlink Control Channel (PDCCH), Narrowband PDCCH (NPDCCH), Enhanced Physical Downlink Control Channel (EPDCCH), MPDCCH, NPBCH etc. Examples of physical signals are wake-up-signal (WUS), CRS, NRS, NPSS, NSSS etc.

The term repetition of a signal used herein may refer to transmitting at least two identically transmitted signals in different time resources e.g. in different subframes. Examples of signals are physical signals (e.g. CRS, PSS, SSS, NRS, NPSS, NSSS etc) and physical channels (e.g. PDCCH, ePDCCH, NPDCCH, MPDCCH, NPDSCH, PDSCH, PBCH, NPBCH, PUCCH, PUSCH, NPUCCH, NPUSCH etc). The UE decodes the signal (e.g. NPDCCH, WUS etc) transmitted with repetition after receiving first transmission of the signal and one or more retransmissions of the same signal.

The embodiments are applicable for a UE in a low or in high activity state. Examples of low activity state are RRC idle state, idle mode, RRC inactive state etc, Examples of high activity state are RRC CONNECTED state, active mode, active state etc. The UE may be configured to operate in DRX or in non-DRX. If configured to operate in DRX, it may still operate according to non-DRX as long as it receives new transmissions from the network node.

The UE may operate under normal coverage, extended coverage or extreme coverage with respect to its serving cell or the target cell on which the measurement is to be performed. These coverage classes are also interchangeably called normal coverage and enhanced coverage in some cases. The UE may also operate in a plurality of coverage levels e.g. normal coverage, enhanced coverage level 1, enhanced coverage level 2, enhanced coverage level 3 and so on.

The coverage level may be expressed in terms of: (i) received signal quality and; or received signal strength at the UE wrt its serving cell and/or (ii) received signal quality and/or received signal strength at the serving cell wrt the UE. Examples of signal quality are signal-to-noise ratio (SNR), signal-to-interference-plus-noise ratio (SINR), CQI, RSRQ, CRS Ês/Iot, SCH Ês/Iot etc. Examples of signal strength are path loss, RSRP, SC_HRP etc. The notation Ês/Iot is defined as a ratio of Ês, which is the received energy per RE (power normalized to the subcarrier spacing) during the useful part of the symbol, i.e. excluding the cyclic prefix, at the UE antenna connector, to Iot which is the received power spectral density of the total noise and interference for a certain RE (power integrated over the RE and normalized to the subcarrier spacing) as measured at the UE antenna connector Consider an example of 2 coverage levels defined with respect to signal quality (e.g. SNR) at the UE comprising:
  Coverage enhancement level 1 (CE1) comprising SNR≥−6 dB at UE wrt its serving cell; and
  Coverage enhancement level 2 (CE2) comprising −12 dB≤SNR<−6 dB at UE wrt its serving cell.

Consider another example of 4 coverage levels comprising:
  Coverage enhancement level 1 (CE1) comprising SNR≥−6 dB at UE wrt its serving cell;
  Coverage enhancement level 2 (CE2) comprising −12 dB≤SNR<−6 dB at UE wrt its serving cell;
  Coverage enhancement level 3 (CE3) comprising −15 dB≤SNR<−12 dB at UE wrt its serving cell; and
  Coverage enhancement level 4 (CE4) comprising −18 dB≤SNR<−15 dB at UE wrt its serving cell In the above example the CD may also interchangeably be called normal coverage level, baseline coverage level, reference coverage level, legacy coverage level etc. On the other hand CE2-CE4 may be termed enhanced coverage or extended coverage level.

Figure 10:
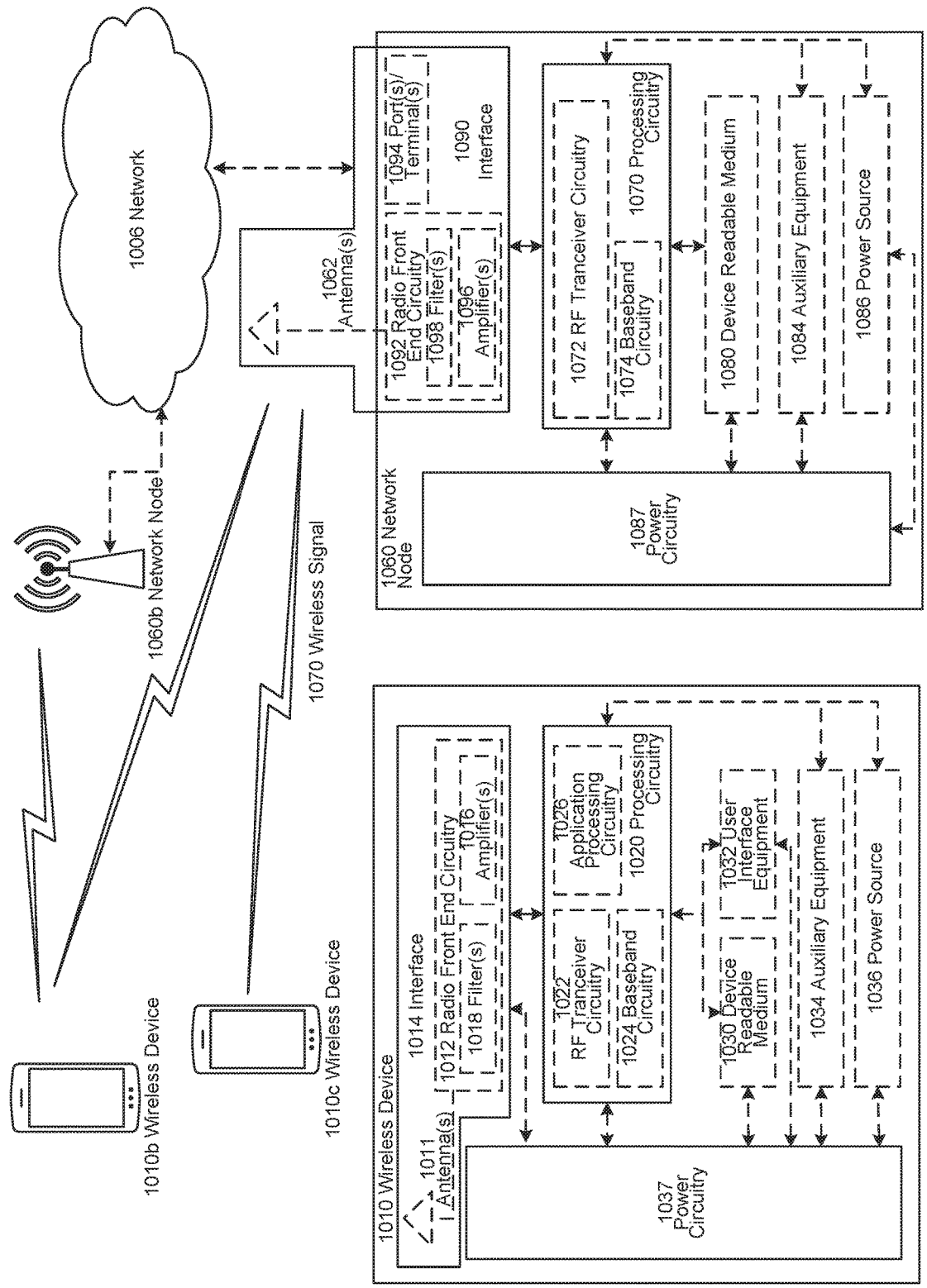
FIG. 10 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 and 1060b, and WDs 1010, 1010b, and 1010c. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IOT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. A radio network node refers to a network node that is configured to operate in a radio access network and/or is configured with a radio transmitter or receiver. Examples of radio network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pica base stations, micro base stations, or macro base stations. A base station may be a relay node or a relay donor node controlling a relay. A radio network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of radio network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs). A core network node refers to a network node that is configured to operate in a core network. Core network nodes may include MSCs, MMEs, or the like. Other examples of network nodes include O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection, Interface 1090 also includes radio front end circuitry 1092 that may be coupled to, or in certain embodiments a part of, antenna 1062, Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection, Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070.

In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and; or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
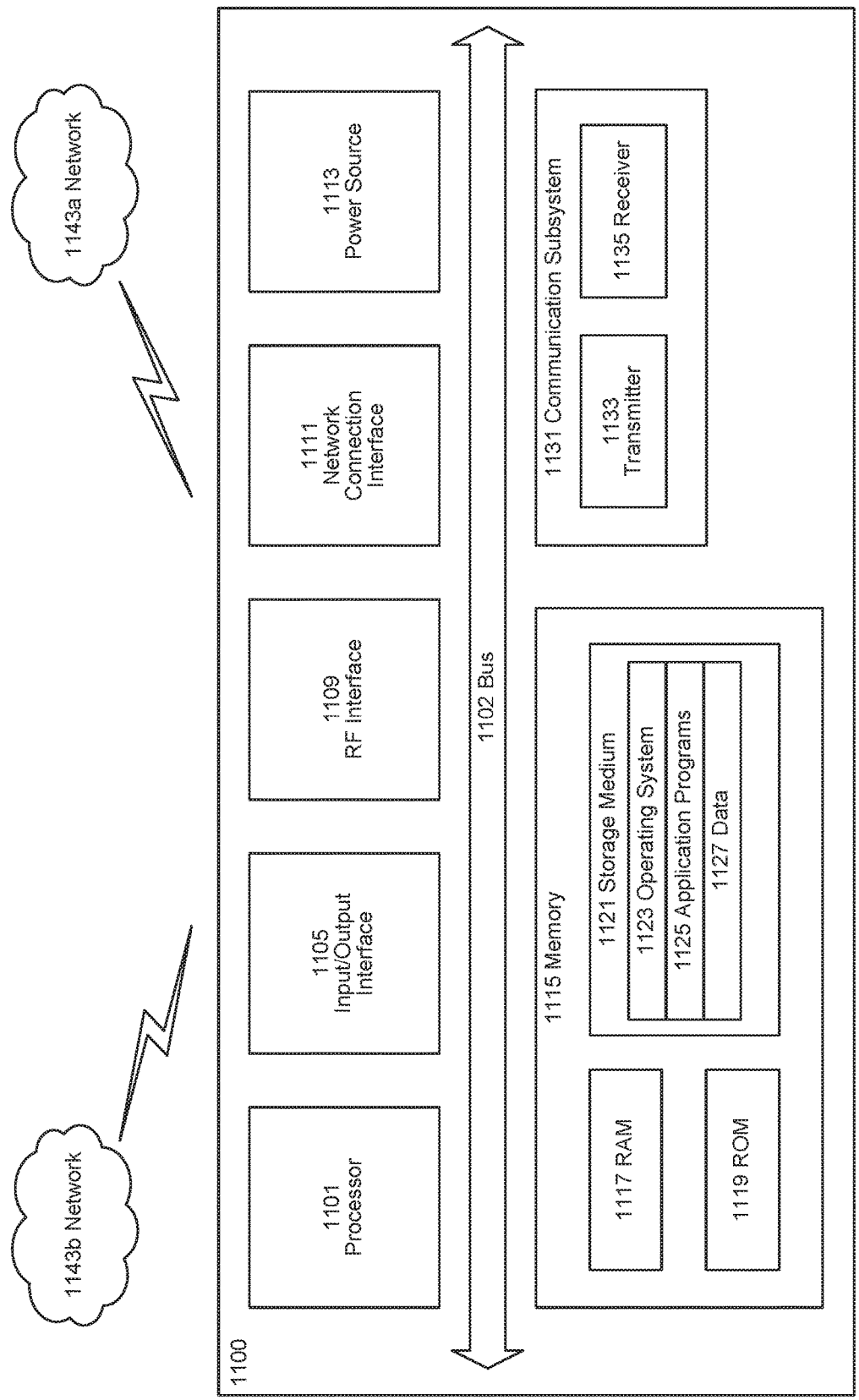
FIG. 11 is a block diagram of a user equipment according to some embodiments.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter), UE 11200 may be any UE identified by the $3^{rd}$ Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143*a*. Network 1143*a* may encompass wired and/or wireless networks such as a local-area network (LAN), a wide-area network (WAN), a computer network, a wireless network, a telecommunications network, another like network or any combination thereof. For example, network 1143*a* may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143*b* using communication subsystem 1131. Network 1143*a* and network 1143*b* may be the same network or networks or different network or networks. Communication subsystem 1131 may be configured to include one or more transceivers used to communicate with network 1143*b*. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143*b* may encompass wired and/or wireless networks such as a local-area network (LAN), a wide-area network (WAN), a computer network, a wireless network, a telecommunications network, another like network or any combination thereof. For example, network 1143*b* may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
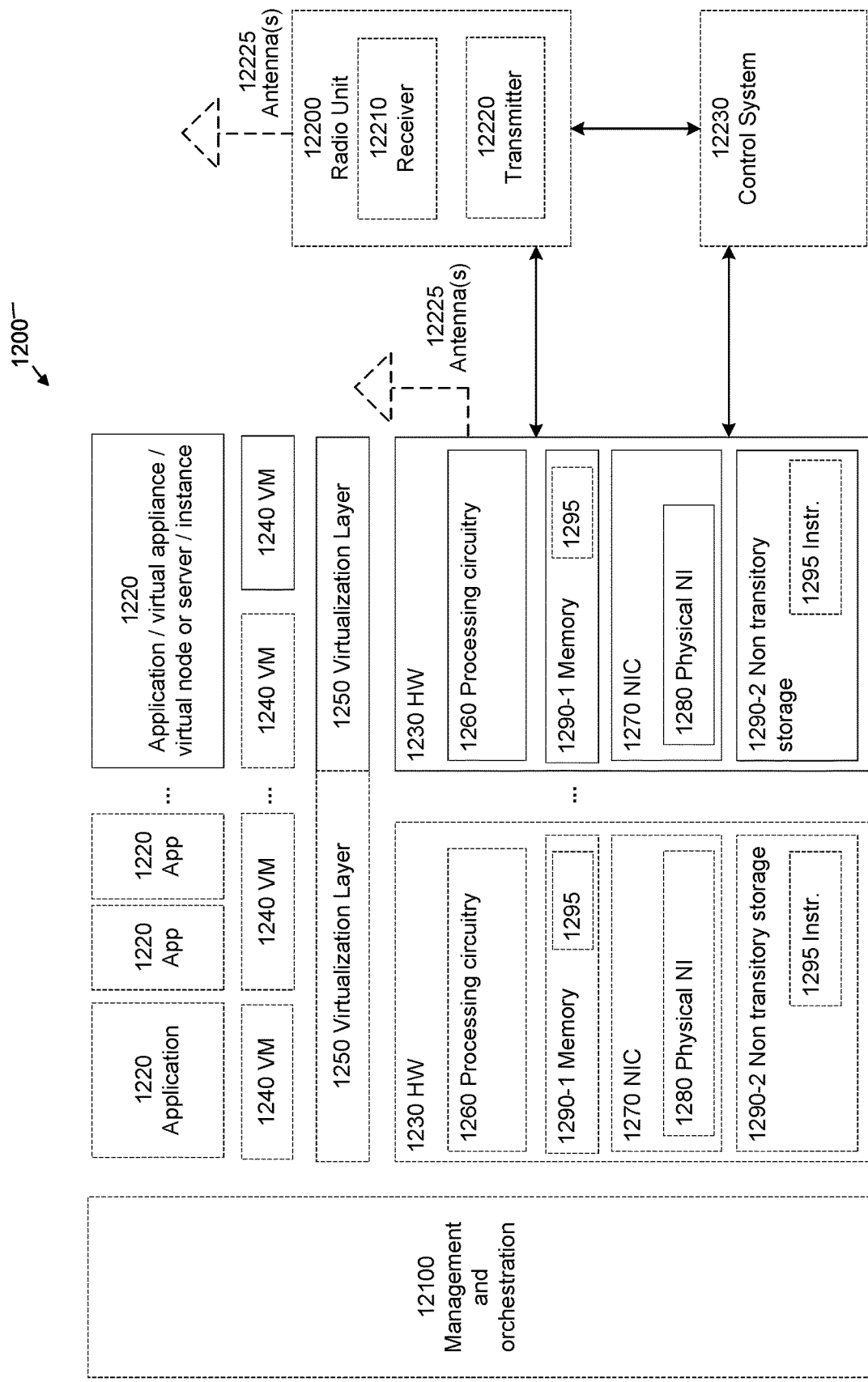
FIG. 12 is a block diagram of a virtualization environment according to some embodiments.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE))

where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 13:
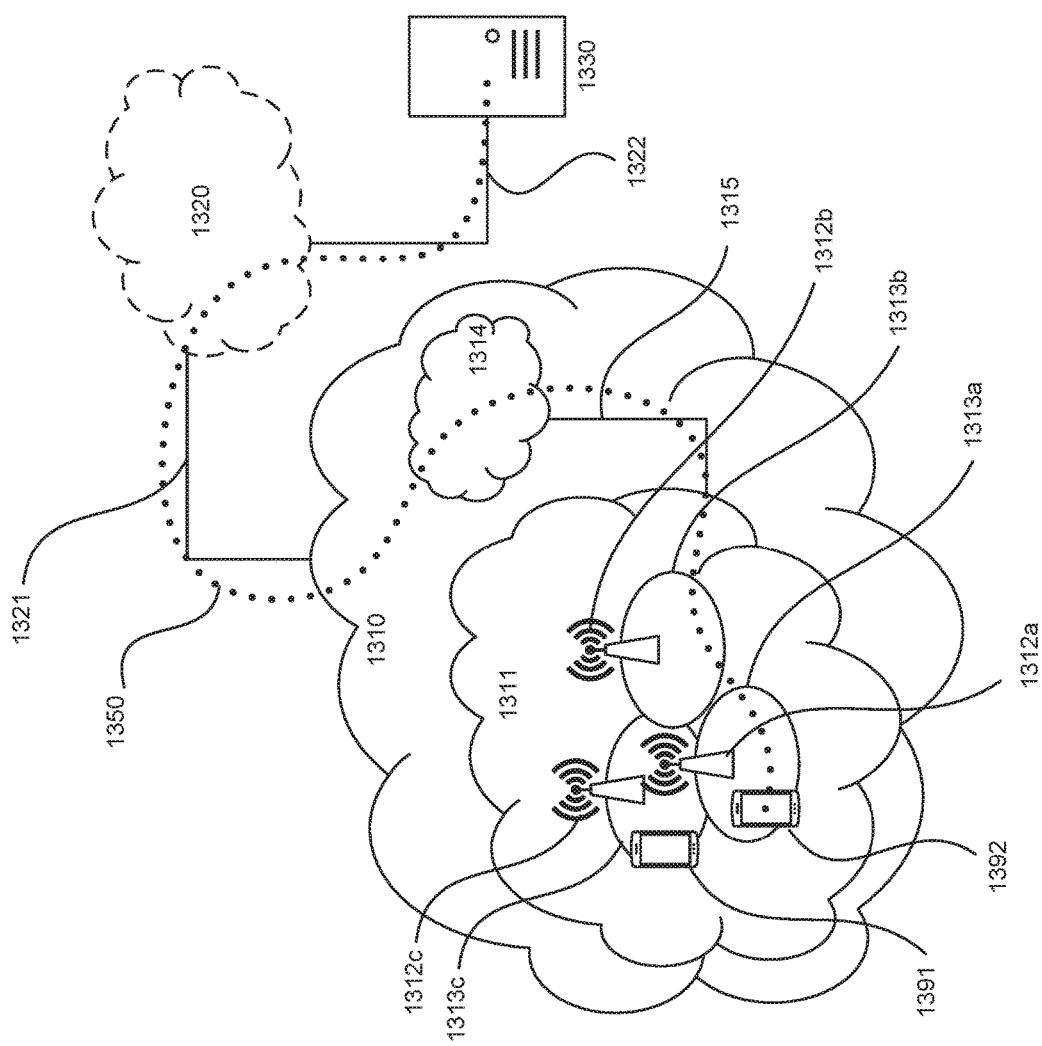
FIG. 13 is a block diagram of a communication network with a host computer according to some embodiments.

FIG. 13 illustrates a telecommunication network connected via an intermediate network to a host computer in accordance with some embodiments. In particular, with reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c, A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider, Connections 1321 and 1322 between telecommunication network 1310 and host computer 1330 may extend directly from core network 1314 to host computer 1330 or may go via an optional intermediate network 1320, Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350, Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 14:
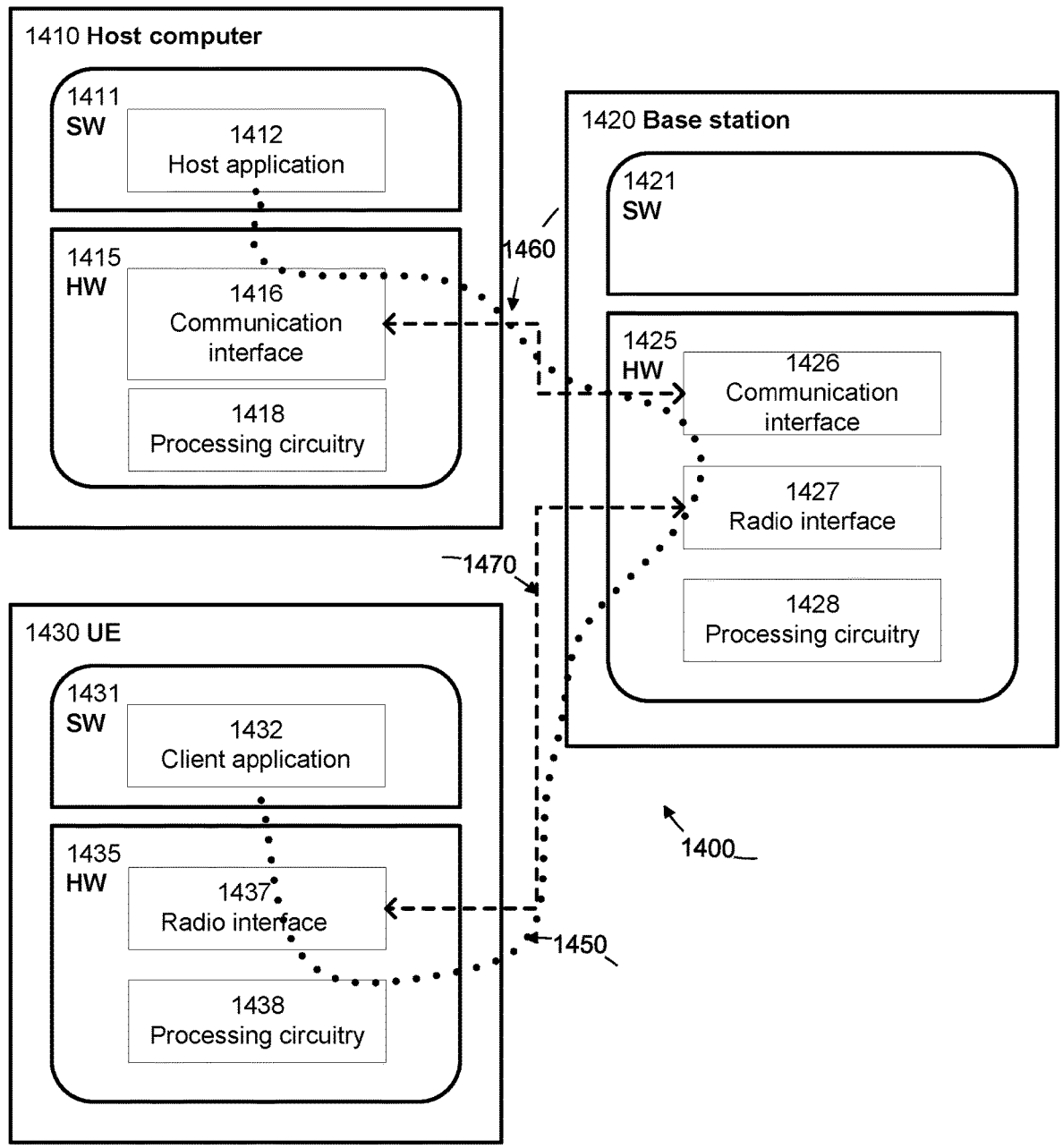
FIG. 14 is a block diagram of a host computer according to some embodiments.

Example implementations, in accordance with an embodiment, of the UE, base station and host computer discussed in the preceding paragraphs will now be described with reference to FIG. 14. FIG. 14 illustrates host computer communicating via a base station with a user equipment over a partially wireless connection in accordance with some embodiments In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418, Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430, further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410, In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 14 may be similar or identical to host computer 1330, one of base stations 1312a, 1312b, 1312c and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the device power consumption and thereby provide benefits such as extended battery lifetime.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
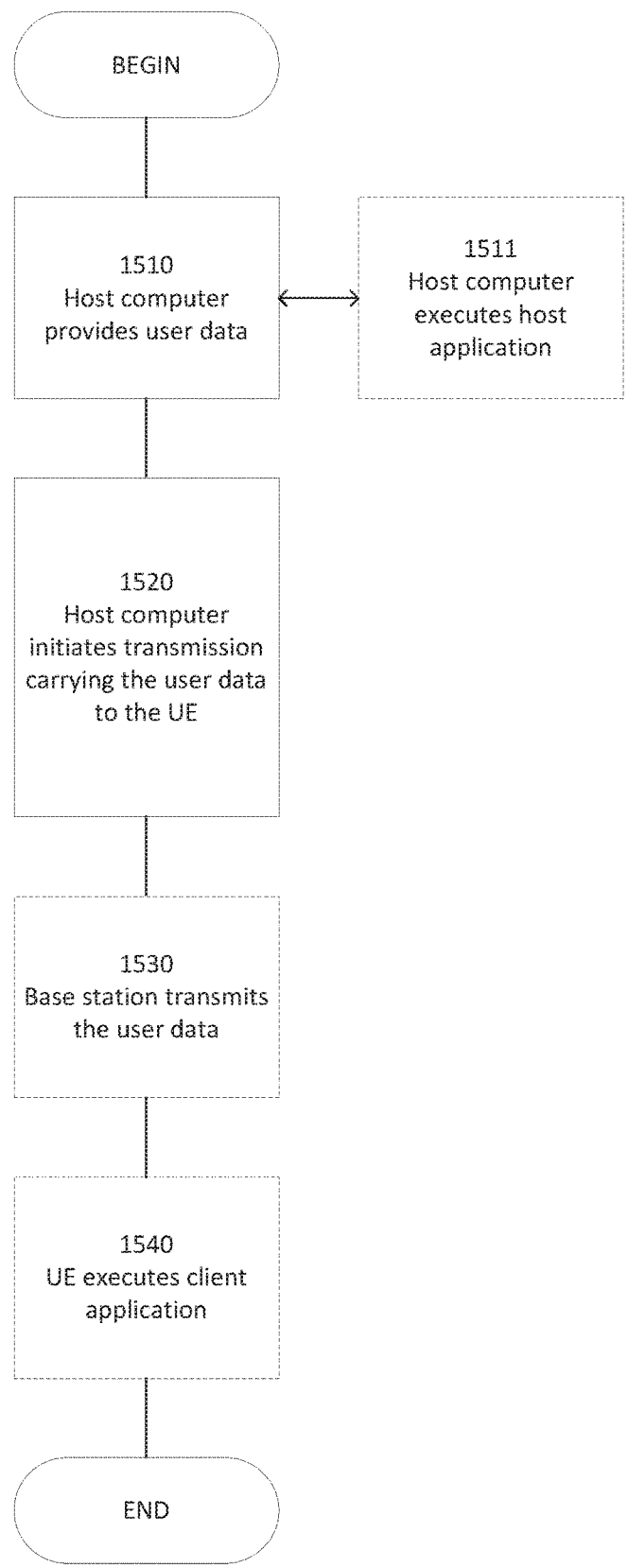
FIG. 15 is a flowchart illustrating a method implemented in a communication system, in accordance with one embodiment.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
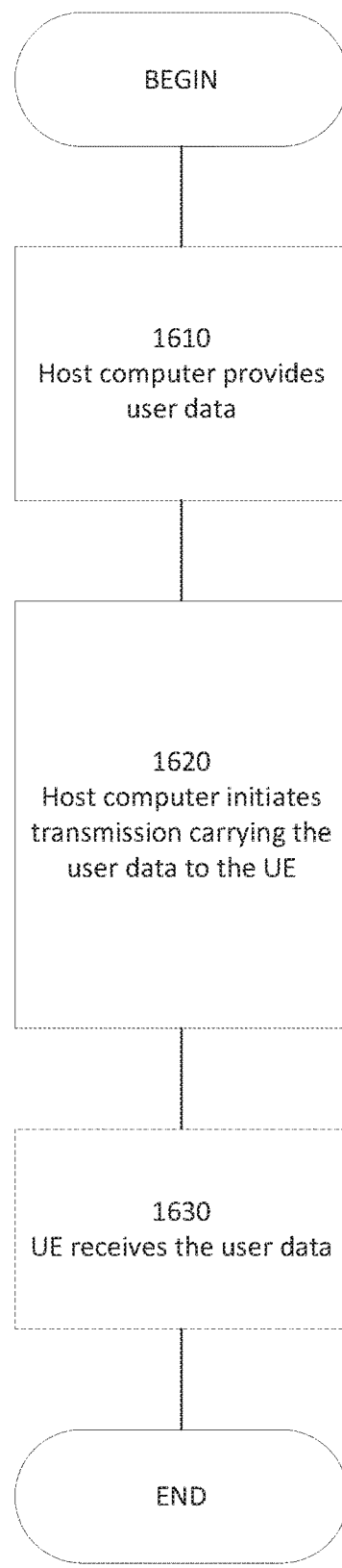
FIG. 16 is a flowchart illustrating a method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
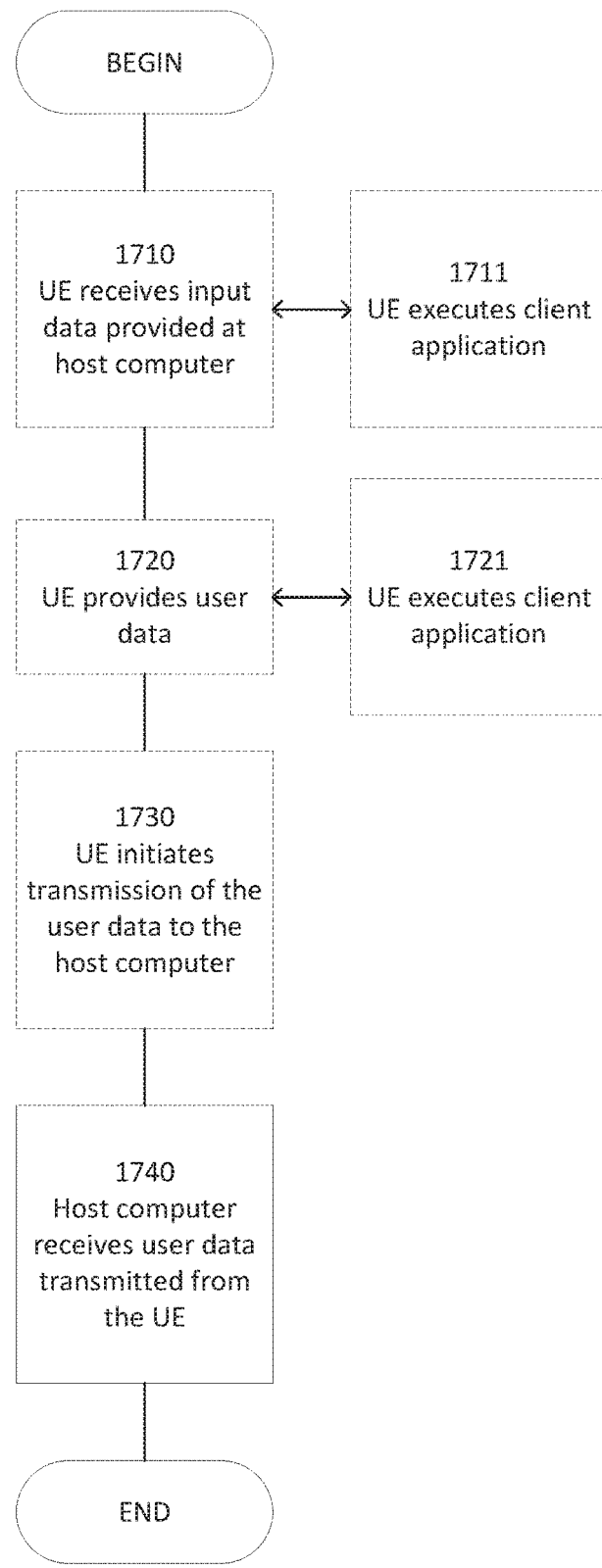
FIG. 17 is a flowchart illustrating a method implemented in a communication system, in accordance with one embodiment.
Figure 18:
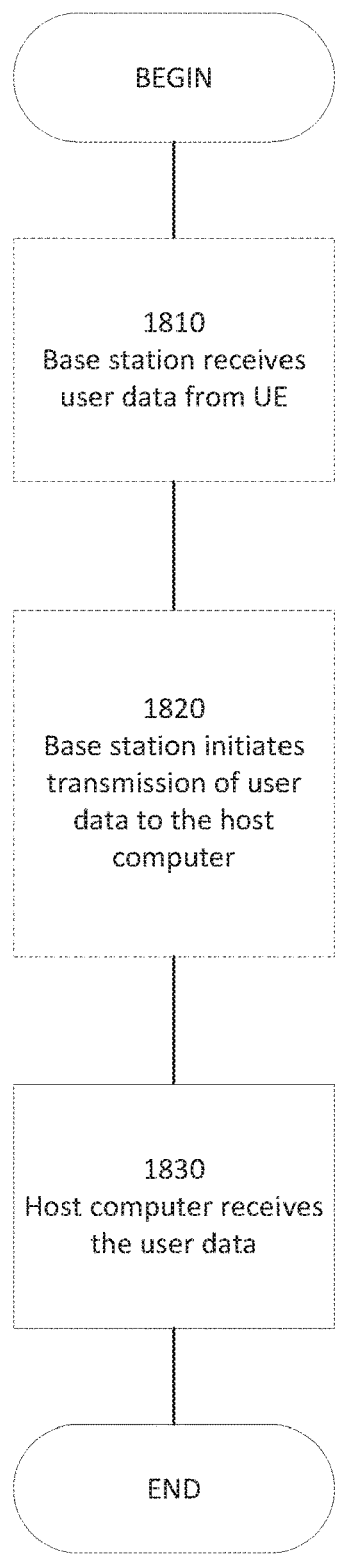
FIG. 18 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure, FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE), The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a wireless device, the method comprising:
    selecting, from among at least first and second measurement modes in which measurements are respectively performed on cells belonging to first and second carriers, one or more measurement modes in which to perform a measurement, wherein the one or more measurement modes are selected based on:
        whether criteria is met for relaxed monitoring of a neighbor cell; and
        whether the wireless device is configured to perform a positioning measurement; and
    performing the measurement in the one or more selected measurement modes.

2. The method of claim 1, wherein said selecting comprises selecting only the second measurement mode if the criteria is met and the wireless device is not configured to perform a positioning measurement.

3. The method of claim 1, wherein the wireless device is allowed to select only the second measurement mode if the criteria is met and the wireless device is not configured to perform a positioning measurement.

4. The method of claim 1, wherein the one or more measurement modes are selected also based on information related to a difference between powers at which a signal or channel to be measured is respectively transmitted on the first and second carriers.

5. The method of claim 1, wherein the measurement is a radio resource management, RRM, measurement or a mobility measurement.

6. The method of claim 1, wherein the measurement is a reference signal received power (RSRP) measurement, a reference signal received quality (RSRQ) measurement, a signal-to-interference-plus-noise (SINR) measurement, or a path loss measurement.

7. The method of claim 1, wherein the relaxed monitoring of the neighbor cell relaxes how often the wireless device is to perform measurements on the neighbor cell.

8. The method of claim 1, further comprising performing one or more operational tasks based on the result of the performed measurement.

9. The method of claim 8, wherein the one or more operational tasks include one or more of:
   power control;
   reporting a result of the measurement to a network node;
   a random access procedure;
   cell selection; or
   cell reselection.

10. The method of claim 1, further comprising reporting a measurement result to a network node based on the selected measurement mode and information related to a difference between powers at which a signal or channel to be measured is respectively transmitted on the first and second carriers.

11. The method of claim 1, wherein the first carrier is an anchor carrier on which System Information is broadcast and the second carrier is a non-anchor carrier on which System Information is not broadcast.

12. The method of claim 1, wherein the first and second carriers are each a Narrowband Internet-of-Things (NB-IoT) carrier.

13. A wireless device comprising:
   communication circuitry; and
   processing circuitry configured to:
      select, from among at least first and second measurement modes in which measurements are respectively performed on cells belonging to first and second carriers, one or more measurement modes in which to perform a measurement, wherein the one or more measurement modes are selected based on:
         whether criteria is met for relaxed monitoring of a neighbor cell; and
         whether the wireless device is configured to perform a positioning measurement; and
      perform the measurement in the one or more selected measurement modes.

14. The wireless device of claim 13, wherein the processing circuitry is configured to select only the second measurement mode if the criteria is met and the wireless device is not configured to perform a positioning measurement.

15. The wireless device of claim 13, wherein the wireless device is allowed to select only the second measurement mode if the criteria is met and the wireless device is not configured to perform a positioning measurement.

16. The wireless device of claim 13, wherein the one or more measurement modes are selected also based on information related to a difference between powers at which a signal or channel to be measured is respectively transmitted on the first and second carriers.

17. The wireless device of claim 13, wherein the measurement is a radio resource management, RRM, measurement or a mobility measurement.

18. The wireless device of claim 13, wherein the measurement is a reference signal received power (RSRP) measurement, a reference signal received quality (RSRQ) measurement, a signal-to-interference-plus-noise (SINR) measurement, or a path loss measurement.

19. The wireless device of claim 13, wherein the relaxed monitoring of the neighbor cell relaxes how often the wireless device is to perform measurements on the neighbor cell.

20. The wireless device of claim 13, wherein the processing circuitry is further configured to perform one or more operational tasks based on the result of the performed measurement.

21. The wireless device of claim 20, wherein the one or more operational tasks include one or more of:
   power control;
   reporting a result of the measurement to a network node;
   a random access procedure;
   cell selection; or
   cell reselection.

22. The wireless device of claim 13, wherein the processing circuitry is further configured to report a measurement result to a network node based on the selected measurement mode and information related to a difference between powers at which a signal or channel to be measured is respectively transmitted on the first and second carriers.

23. The wireless device of claim 13, wherein the first carrier is an anchor carrier on which System Information is broadcast and the second carrier is a non-anchor carrier on which System Information is not broadcast.

24. The wireless device of claim 13, wherein the first and second carriers are each a Narrowband Internet-of-Things (NB-IoT) carrier.

25. A non-transitory computer-readable medium having stored thereon instructions that, when executed by a processor of a wireless device, cause the wireless device to:
   select, from among at least first and second measurement modes in which measurements are respectively performed on cells belonging to first and second carriers, one or more measurement modes in which to perform a measurement, wherein the one or more measurement modes are selected based on:
      whether criteria is met for relaxed monitoring of a neighbor cell; and
      whether the wireless device is configured to perform a positioning measurement; and
   perform the measurement in the one or more selected measurement modes.

26. The method of claim 1, further comprising tuning a receiver of the wireless device to the second carrier for paging and data reception, wherein said selecting comprises selecting only the second measurement mode, and wherein said performing comprises performing the measurement in the second measurement mode without re-tuning the receiver to the first carrier.

27. The wireless device of claim 13, wherein the processing circuitry is further configured to tune a receiver of the wireless device to the second carrier for paging and data reception, wherein the processing circuitry is configured to select only the second measurement mode, and wherein the processing circuitry is configured to perform the measurement in the second measurement mode without re-tuning the receiver to the first carrier.

* * * * *